(12) United States Patent
Cannella

(10) Patent No.: US 9,932,945 B2
(45) Date of Patent: Apr. 3, 2018

(54) METHOD OF REDUCING NITROGEN OXIDE EMISSIONS

(75) Inventor: William J. Cannella, Orinda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 542 days.

(21) Appl. No.: 12/641,665

(22) Filed: Dec. 18, 2009

(65) Prior Publication Data

US 2011/0146606 A1 Jun. 23, 2011

(51) Int. Cl.
| | | |
|---|---|---|
| C10L 1/26 | (2006.01) | |
| F02M 37/00 | (2006.01) | |
| C10L 1/08 | (2006.01) | |
| F02M 25/00 | (2006.01) | |
| F02B 1/12 | (2006.01) | |
| F02D 41/00 | (2006.01) | |
| F02D 41/30 | (2006.01) | |

(52) U.S. Cl.
CPC ........... *F02M 37/0064* (2013.01); *C10L 1/08* (2013.01); *F02M 25/00* (2013.01); *F02B 1/12* (2013.01); *F02D 41/0057* (2013.01); *F02D 41/3035* (2013.01)

(58) Field of Classification Search
CPC ........... C10L 2270/026; C10L 2230/10; C10L 2290/00
USPC .......................................................... 208/15
See application file for complete search history.

(56) References Cited

U.S. PATENT DOCUMENTS

| | | | |
|---|---|---|---|
| 2,674,521 A * | 4/1954 | Houdry ................ | B01D 53/944 422/180 |
| 3,226,339 A | 12/1965 | Brilette et al. | |
| 3,236,761 A | 2/1966 | Rabo et al. | |
| 3,236,762 A | 2/1966 | Rabo et al. | |
| 3,373,109 A | 3/1968 | Brilette et al. | |
| 3,620,960 A | 11/1971 | Kozlowski et al. | |
| 4,202,996 A | 5/1980 | Hilfman | |
| 4,347,121 A | 8/1982 | Mayer et al. | |
| 4,440,781 A | 4/1984 | Benecke et al. | |
| 4,440,871 A | 4/1984 | Lok et al. | |
| 4,710,485 A | 12/1987 | Miller | |
| 4,810,357 A | 3/1989 | Chester et al. | |
| 4,851,109 A * | 7/1989 | Chen ...................... | C10G 65/12 208/18 |
| 5,135,638 A | 8/1992 | Miller | |
| 5,389,112 A | 2/1995 | Nikanjam et al. | |
| 5,730,762 A | 3/1998 | Murakami et al. | |
| 5,792,339 A | 8/1998 | Russell | |
| 6,096,103 A | 8/2000 | Hubbard et al. | |
| 6,291,732 B2 | 9/2001 | Hubbard et al. | |
| 6,663,767 B1 | 12/2003 | Berlowitz et al. | |
| 6,893,475 B1 | 5/2005 | Ellis et al. | |
| 7,951,287 B2 | 5/2011 | Miller et al. | |
| 2001/0001803 A1 | 5/2001 | Hubbard et al. | |
| 2002/0062055 A1 * | 5/2002 | Raulo .................... | C10G 45/54 585/739 |
| 2004/0127371 A1 | 7/2004 | Arrowsmith et al. | |
| 2005/0188605 A1 | 9/2005 | Valentine et al. | |
| 2006/0138024 A1 | 6/2006 | Miller et al. | |
| 2006/0179823 A1 * | 8/2006 | Hinz ....................... | F01N 3/021 60/288 |
| 2009/0313890 A1 * | 12/2009 | Lopez et al. .................... | 44/385 |
| 2010/0326881 A1 | 12/2010 | Lopez et al. | |

FOREIGN PATENT DOCUMENTS

| | | |
|---|---|---|
| CA | 2405087 A1 | 11/2001 |
| JP | 2006-28493 A | 2/2006 |
| JP | 2006-274062 A | 10/2006 |

(Continued)

OTHER PUBLICATIONS

Paul Norton, Keith Vertin, Brent Bailey, Bigel N Clark, Donald Lyons, Stephen Goguren, and James Eberhardt, Emissions from Trucks using Fischer-Tropsch Diesel Fuel, Alternative Fuels 1998, pp. 1-10 (Year: 1998).*

(Continued)

*Primary Examiner* — Ellen M McAvoy
*Assistant Examiner* — Ming Cheung Po
(74) *Attorney, Agent, or Firm* — Ryan, Mason & Lewis, LLP

(57) ABSTRACT

A method of reducing nitrogen oxide emissions, the method comprising (i) injecting a petroleum-derived diesel fuel composition having:
  (a) a sulfur content of less than 10 ppm;
  (b) a flash point of greater than 50° C.;
  (c) a UV absorbance, $A_{total}$, of less than 1.5 as determined by the formula comprising $$A_{total} = A_x + 10(A_y)$$

wherein $A_x$ is the UV absorbance at 272 nanometers; and
  wherein $A_y$ is the UV absorbance at 310 nanometers;
  (d) a naphthene content of greater than 5 percent;
  (e) a cloud point of less than −12° C.;
  (f) a nitrogen content of less than 10 ppm; and
  (g) a 5% distillation point of greater than 300 F and a 95% distillation point of greater than 600 F, in an advanced combustion engine;
(ii) combusting the petroleum-derived diesel fuel in (i) in a combustion chamber of a non-spark ignited engine, wherein nitrogen oxide emissions are lower than those nitrogen oxide emissions when a conventional diesel fuel is employed in a non-spark ignited engine.

19 Claims, 10 Drawing Sheets

(56) References Cited

FOREIGN PATENT DOCUMENTS

| JP | 2007-269865 | A | 10/2007 |
|---|---|---|---|
| JP | 2007270107 | A | 10/2007 |
| WO | 2006078763 | A2 | 7/2006 |
| WO | 2009155246 | A2 | 12/2009 |

OTHER PUBLICATIONS

El Shamy, A. A., Zayed A. M , Gas to Liquids Technology,: A Futuristic View, TESCE, 2004, pp. 89-111 (Year: 2004).*

Hideyuki Ogawa, Taku Ibuki, Takayuki Minematsu, and Noboru Miyamoto, Diesel Combustion Characteristics of Decalin as a High Productivity GTL Fuel, 2006, pp. 132-137 (Year: 2006).*

Paul Schaberg, The POtential of GTL Diesel to Meet Future Exhaust emission Limits, Sasol Technology, 2006 (Year: 2006).*

The FTP (Federal Test Procedure) heavy-duty transcient cycle is currently used for emission testing of heavy-duty on-road engines in the USA [CFR Title 40, Part 86.1333] http://www.dieselnet.com/standards/cycles/ftp_trans.html.

Anderson, et al., J. Catalysis 58.114 (1979).

R.M. Barrer in Zeolites, Science and Technology, edited by F. R. Rodrigues, L. D. Rollman and C. Naccache, NATO ASI Series, 1984 (see particularly p. 75).

Meier, W. H., Olson, D. H., and Baerlocher, C., Atlas of Zeolite Structure Types, Elsevier, 1996.

Kokotailo, G. T., et al, Zeolites, 5, 349(85).

Breck, Zeolite Molecular Sieves. 1974 (especially Chapter 8).

International Search Report issued in counterpart International Patent Application No. PCT/US2010/059473.

International Search Report issued in counterpart European Application No. 10838129.4.

International Office Action issued in counterpart Japanese Patent Application No. 2012-544626 dated Oct. 16, 2014.

Japanese Office Action issued in counterpart Japanese Patent Appln. No. 2015-151646 dated Apr. 15, 2016.

The FTP (Federal Test Procedure) heavy-duty transient cycle is currently used for emission:testing of heavy-duty on-road engines in the USA [CFR Title 40, Part 86.1333] http://www.dieselnet.com/standards/cycles/ftp trans.html.

Anderson et at, J.Catalysis 58, 114 (1979).

R.M. Barrer in Zeolites, Science and Technology, edited by F. R. Rodrigues. L. D. Rollman and C Naccache, NATO ASI Series, 1964 (see particularly p. 75).

Meier, W. H. Olson, D. H., and Baerlocher, C., Atlas of Zeolite Types, Elsevier, 1996.

Kokotailo, G T., et al. Zeolites, 5, 349(85).

Meier, W. M. and Olsen, D. H., Atlas of Zeolite Structure Types, Butterworths, 1987.

Breck, Zeolite Molecular Sieves. 1974 (especialty Chapter 8).

* cited by examiner

NOx Emissions Results for Small Passenger Vehicle Engine Operated in Mild HCCI Advanced Combustion Mode NO$_x$ Emissions Results for Heavy Duty Diesel Engine Operated in Conventional Diesel Combustion Mode $CO_2$ Emissions Results for Heavy Duty Diesel Engine Operated in Conventional Diesel Combustion Mode Diesel Hydrotreating for Sulfur Removal
Nobel Base Metal Hydrogenation for Aromatic Saturation Lube Oil Hydrocracking / Diesel Hydrotreating for VI Upgrade and Sulfur Removal followed by Waxy Lube Oil / Diesel Iso-Dewaxing / Hydrofinishing for Odorless Diesel Production Single Stage Process with High Activity Base Metal Catalysts Single Stage Process with High Activity Noble Metal Catalysts Flash Point: Correlation of Pensky Marten and D2887 5 % Initial Boiling Point

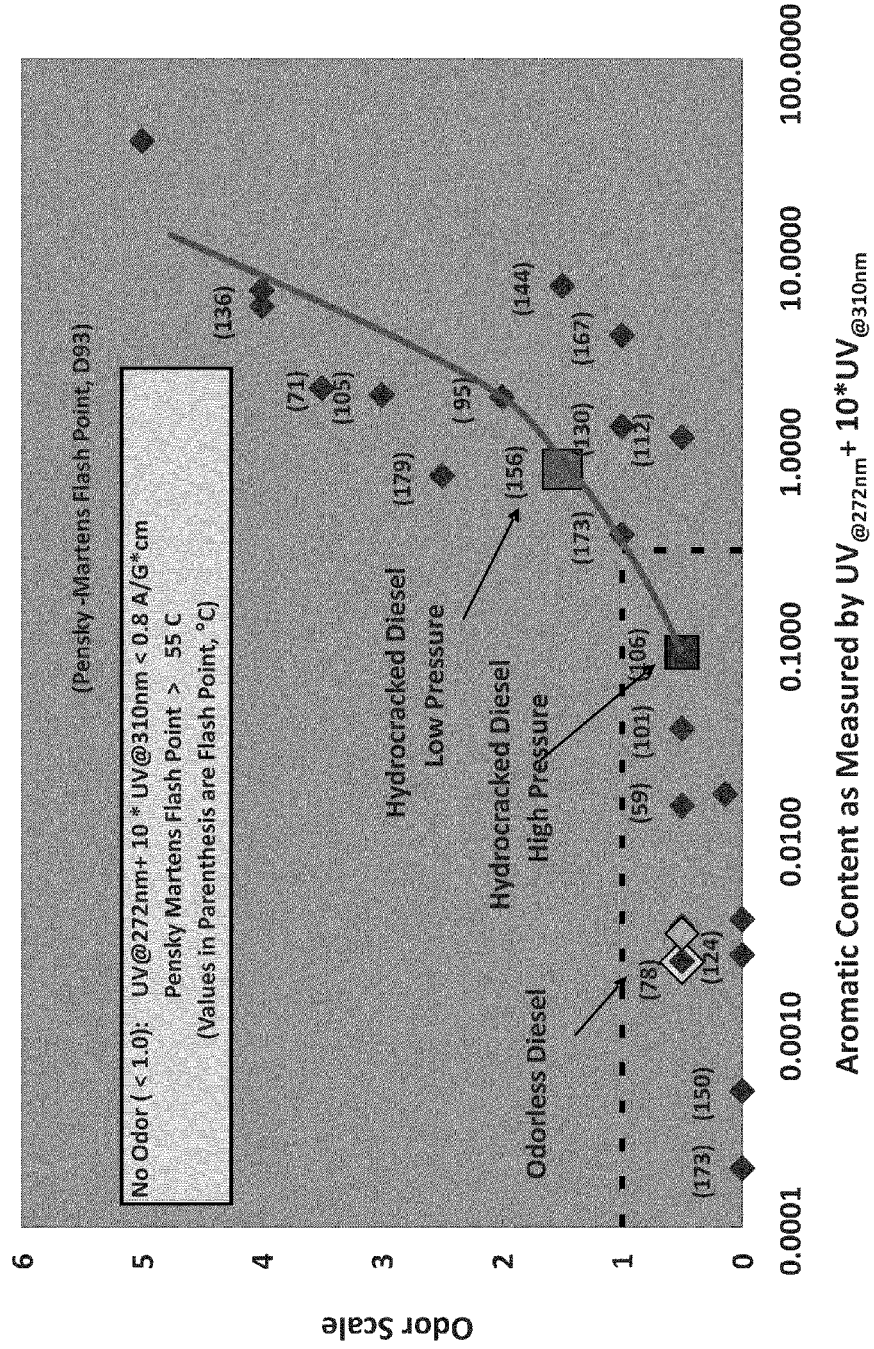

METHOD OF REDUCING NITROGEN OXIDE EMISSIONS

FIELD OF THE INVENTION

The present invention is directed to a method of reducing nitrogen oxide (NO$_x$) emissions in diesel fueled internal combustion engines. Reduction of NO$_x$ emissions is achieved when a premium diesel fuel composition is employed in the combustion chamber of an HCCI engine at a designated compression ratio or in the combustion chamber of a heavy duty diesel engine at standardized federal test procedures.

BACKGROUND OF THE INVENTION

Un-combusted diesel fuel, including ultra-low sulfur diesel (ULSD), has a strong odor. The odor often associated with diesel is unpleasant and may deter customers from purchasing diesel vehicles. In particular, the diesel fuel, when spilled, especially on one's hands or clothing, may have a prolonged bad odor. Also diesel fuel stored in equipment contained in garages, basements, sheds, or even houses can emit an odor that may make it undesirable to store the equipment or fuel indoors.

Several factors lead to diesel fuel odor. Eliminating only some of the factors can result in a diesel fuel that still has an unacceptable odor. Understanding and controlling most or all the factors is necessary to achieve a fuel that has a truly low odor level or no odor. Another important consideration is that when the odor causing components are eliminated from the prospective fuel it may no longer meet all the required specifications for the fuel. Only by careful balancing of the factors can a fuel be produced that both has low odor and meets diesel fuel specifications.

Additionally, emissions, especially NO$_x$ emissions, from vehicles utilizing diesel are also relatively high. The current approach in reducing NO$_x$ to levels that meet governmental environmental regulations is to use exhaust aftertreatment systems (such as Selective Catalyst Reduction Systems or NO$_x$ traps) that convert engine-out NO$_x$ to less harmful species such as N$_2$. However, these systems are not always the best solution because they may (1) be costly, (2) add to the weight of the vehicle, (3) require addition of chemicals such as urea, and (4) hurt fuel economy due to the added weight and the need to burn additional fuel to regenerate the NO$_x$ conversion components. Use of the premium, odorless diesel product of the present invention will produce less engine-out NO$_x$, thus enabling less frequent regenerations, and/or a reduction in size or elimination of the aftertreatment system. Further, older vehicles which do not have extensive aftertreatment equipment should have lower emissions with this premium, odorless diesel product.

It has been discovered that some key factors in reducing or eliminating diesel fuel odor are adjusting the aromatic content, adjusting the amounts of volatile and low-boiling point compounds, and controlling the amount of sulfur and other heteroatoms in the diesel fuel. It has also been discovered that this low/no odor diesel fuel, when employed in certain engine environments, results in low NO$_x$ emissions.

DESCRIPTION OF THE RELATED ART

Murakami et al., U.S. Pat. No. 5,730,762 teach a diesel fuel of reduced sulfur content which contains an alkyl side chain on the aromatic ring and also contains hetero nitrogen compounds with an alkyl side chain. The composition also includes carbazole and indole compounds as components of the fuel composition.

Nikanjam et al., U.S. Pat. No. 5,389,112 disclose a diesel fuel with low aromatic content and high cetane number. There are controlled amounts of aromatics in the fuel to produce an optimum cetane number as defined by a graph set forth in the patent. The fuel can also have added thereto a cetane improver. The composition also includes 2-ethylhexylnitrate as the cetane improver.

Russell U.S. Pat. No. 5,792,339 discloses a diesel fuel which minimizes the production of pollutants from vehicles by adjusting the amounts of aromatic compounds in the fuel. The composition also includes polycyclic aromatics of between 5.0 to 8.6 weight %.

Hubbard et al., U.S. Pat. No. 6,096,103 teach the use of mineral spirits with low sulfur and low odor in diesel engines.

Hubbard et al., U.S. Pat. No. 6,291,732 teach a diesel fuel comprising a blend of aromatic and aliphatic mineral spirits having a low sulfur content for use in cold climates.

Ellis et al., U.S. Pat. No. 6,893,475 disclose a distillate fuel having a sulfur level of less than about 100 wppm, a total aromatics content of about 15 to 35 wt. %, a polynuclear aromatics content of less than about 3 wt. %, wherein the ratio of total aromatics to polynuclear aromatics is greater than about 11.

While low sulfur diesel fuels and low emissions diesel fuels are known in the art, diesel fuels specifically formulated to have low or no odor through the reduction of sulfur, nitrogen, aromatic, and volatile compounds are novel.

SUMMARY OF THE INVENTION

In one embodiment, the present invention is directed to a method of reducing nitrogen oxide emissions, the method comprising
  (i) injecting a petroleum-derived diesel fuel composition having:
    (a) a sulfur content of less than 10 ppm;
    (b) a flash point of greater than 50° C.;
    (c) a UV absorbance, A$_{total}$, of less than 1.5 as determined by the formula comprising $$A_{total}=A_x+10(A_y)$$

wherein A$_x$ is the UV absorbance at 272 nanometers; and
      wherein A$_y$ is the UV absorbance at 310 nanometers;
    (d) a naphthene content of greater than 5 percent;
    (e) a cloud point of less than −12° C.;
    (f) a nitrogen content of less than 10 ppm; and
    (g) a 5% distillation point of greater than 300 F and a 95% distillation point of greater than 600 F, in an advanced combustion engine;
  (ii) combusting the petroleum-derived diesel fuel in (i) in a combustion chamber of a non-spark ignited engine, wherein nitrogen oxide emissions are lower than those nitrogen oxide emissions when a conventional diesel fuel is employed in a non-spark ignited engine.

BRIEF DESCRIPTION OF THE DRAWING

FIG. 10 depicts the correlation between flash point as determined by Pensky-Marten, ASTM D93 and 5% initial boiling point as determined by ASTM D2187.

DETAILED DESCRIPTION OF THE INVENTION

Figure 1:
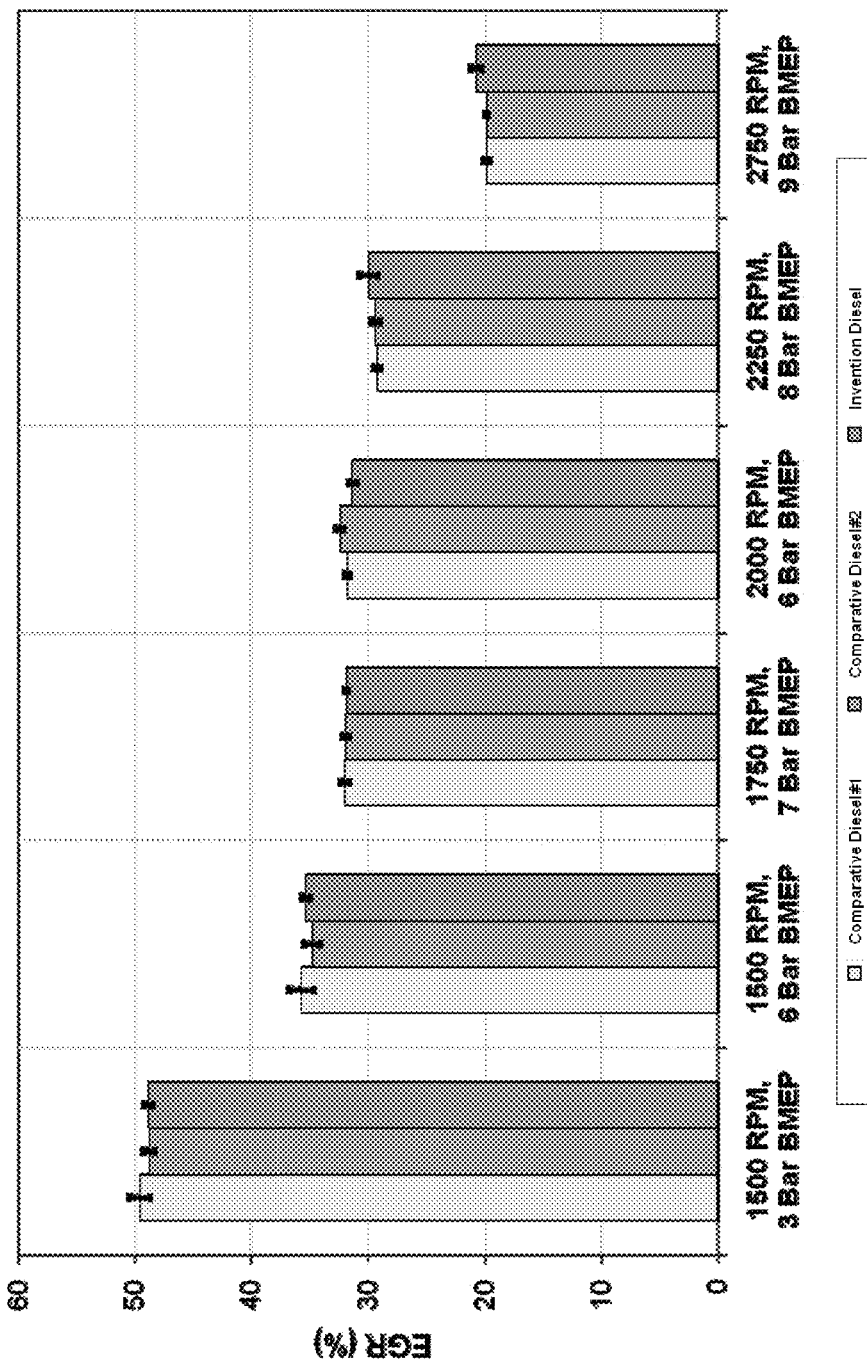
FIG. 1 depicts the volumetric percent of exhaust gas recycled to the engine for the diesel fuel employed in the invention and for the comparative diesel fuels.

While the invention is susceptible to various modifications and alternative forms, specific embodiments thereof are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

Definitions

HCCI Engine—Homogenous Charge Compression Ignition engine. The fuel/air mixture that is used in these engines is homogenous. The fuel ignites upon suitable compression of the fuel/air mixture Diesel Engine—The fuel/air mixture that is used is a stratified mixture wherein the fuel is concentrated in one area of the cylinder. Typically, the fuel ignites upon suitable compression of the stratified mixture.

HDT—refers to "hydrotreater."

HDC—refers to "hydrocracker."

IDW—refers to "dewaxing."

Hydrogenation/hydrocracking catalyst may also be referred to as "hydrogenation catalyst" or "hydrocracking catalyst."

The terms "feed", "feedstock" or "feedstream" may be used interchangeably.

The term "heteroatom" refers to any atom that is not carbon or hydrogen. Typical heteroatoms include, but are not limited to, nitrogen, sulfur, phosphorus, and oxygen.

The term "UV" refers to ultraviolet wavelengths of light in the range of about 10 nanometers to about 400 nanometers.

All elemental group notations (e.g., Group VIII) refer to CAS Notation.

Method of Reducing Nitrogen Oxide Emissions

One embodiment of the present invention is directed to reducing nitrogen oxide (NOx) emissions in a non-spark ignited engine when a petroleum-derived diesel fuel composition, as described hereinbelow, is employed in a non-spark ignited engine. Nitrogen oxide emissions are decreased when compared to the nitrogen oxide emissions when a conventional diesel fuel composition is employed in a non-spark ignited engine.

It has been discovered that NOx emissions decrease when the petroleum-derived diesel fuel composition described hereinbelow is used in a non-spark ignited engine (e.g., heavy duty diesel engine and advanced combustion engine).

In one embodiment, the diesel fuel composition described herein below is injected into an advanced combustion engine, preferably a homogenous charge compression ignition (HCCI) engine; the diesel fuel composition is then combusted in the advanced combustion engine and from about 20 volume percent to about 55 volume percent is recycled to the combustion chamber and the nitrogen oxide emissions are less than 0.45 g/kWh.

It has also been discovered that the nitrogen oxide emissions vary at certain HCCI engine operating conditions. (See FIG. 2) The following has been discovered:

TABLE A

NOx Emissions at Various HCCI Engine Operating Conditions

| Engine Load, Bar BMEP | Revolutions Per Minute (RPM) | Exhaust Gas Recycle (EGR) | NOx Emissions g/kWh |
|---|---|---|---|
| 3 | 1500 | 50% | Less than 0.25 |
| 6 | 1500 | 30-40% | Less than 0.3 |
| 7 | 1750 | Approx. less than 35% | Less than 0.38 |
| 6 | 2000 | Approx. less than 35% | Less than 0.5 |
| 8 | 2250 | Approx. less than 30% | Less than 0.4 |

It has also been discovered that nitrogen emissions are lower when the petroleum-derived diesel fuel composition, which is described hereinbelow, is employed in a heavy duty diesel engine than when a conventional diesel fuel composition is employed in a heavy duty diesel engine at the same operating conditions.

In one embodiment, the engine is a heavy duty diesel engine. NOx emissions were determined based upon heavy duty federal test procedures (FTP)[1] which are herein incorporated by reference. At FTP Hot, NOx emissions for the petroleum-derived diesel fuel composition, described hereinbelow, was less than 4.5 g/hp-hr. At FTP Cold, NOx emissions for the petroleum-derived fuel composition, described hereinbelow, was less than 5.0 g/hp-hr. By comparison, for two different conventional diesel fuel compositions, NOx emissions were greater than 4.5 g/hp-hr at FTP Hot and greater than 5.3 g/hp-hr at FTP Cold. (See FIG. 3).

[1] The FTP (Federal Test Procedure) heavy-duty transient cycle is currently used for emission testing of heavy-duty on-road engines in the USA [CFR Title 40, Part 36.1333]. . . . The FTP transient test is based on the UDDS chassis dynamometer driving cycle. https://www.dieselnet.com/standards/cycles/ftp_trans.html At FTP Hot, $CO_2$ emissions for the petroleum-derived diesel fuel composition, described hereinbelow, was less than 530 g/hp-hr. At FTP Cold, $CO_2$ emissions for the petroleum-derived fuel composition, described hereinbelow, was less than 550 g/hp-hr. By comparison, for two different conventional diesel fuel compositions, $CO_2$ emissions were greater than 530 g/hp-hr at FTP Hot and greater than 550 g/hp-hr at FTP Cold. (See FIG. 4).

Diesel Fuel Composition

A diesel fuel composition comprises various compounds including sulfur compounds, nitrogen compounds, aromatic compounds and volatile compounds (light ends). In order to achieve a low or no odor diesel fuel, it has been discovered that heteroatom-containing compounds, aromatic content, and volatile light ends need to be reduced.

Elimination of most of the sulfur compounds that make up the diesel fuel composition results in a diesel fuel that has reduced odor. Furthermore, if the diesel fuel composition has some sulfur compounds, the type of sulfur compound will dictate whether the diesel fuel composition has a strong odor. The total sulfur content of the diesel fuel composition of the invention is less than 10 ppm; more preferred, less than 6 ppm; and most preferred, less than 3 ppm.

Another type of heteroatom which can impart an odor to diesel fuel is nitrogen. Nitrogen containing compounds can be organic compounds such as aliphatic or aromatic hydrocarbons with a nitrogen containing substituent or inorganic nitrogen containing compounds such as ammonium compounds, nitrates, and nitrites. Accordingly, the diesel fuel composition of the invention may have a nitrogen content of less than 10 ppm; more preferred, less than 5 ppm; and most preferred, less than 1 ppm.

Aromatic compounds are other compounds that have also been found to contribute to diesel fuel odor. It has been discovered that reduction of the aromatic content of the fuel can also greatly reduce the odor of the fuels. As with sulfur and nitrogen compounds, the species of aromatic compounds in the fuel can have an effect on the odor, but generally it has been found that a diesel fuel composition with very low total aromatic levels has a decreased odor.

Aromatic content may also be approximated by the UV absorbance at specific wavelengths, namely at 272 and 310 nm. Aromatic compounds typically absorb ultraviolet (UV) wavelengths of light in the range of 272 nanometers (nm) and 310 nanometers (nm). Accordingly, the sum of UV absorbances, given as $A_{total}$, is related to the aromatic content of a given diesel fuel. We have found that $A_{total}$ as given in the formula $$A_{total} = A_{272} + 10(A_{310})$$

wherein $A_{272}$ is the UV absorbance at 272 nm and wherein $A_{310}$ is the UV absorbance at 310 nm, must be less than about 1.5, preferably less than about 1.0, and most preferably less than about 0.8 to have the odorless diesel fuel composition of the present invention.

In an embodiment of the present invention, the total aromatic compound content of the fuel is less than 10%, preferably less than 7.5%, more preferably less than 5%, most preferably less than 2%, even more preferred less than 1%, and even most preferred less than 0.5%. Aromatic content was measured using Supercritical Fluid Chromatography (SFC), ASTM D5186.

By measuring the $A_{total}$ of a given feedstock, the degree in which to hydrotreat is determined in order to produce a low odor diesel fuel.

Still yet another factor that has been found to be important or critical in achieving a low or no odor fuel is the amount of the volatile or light boiling components in the fuel. These components are often referred to as light ends or "front end" of the diesel fuel range. It has been found that by decreasing the light boiling components of the diesel fuel, in combination with decreasing the other components listed above, a low or no odor diesel fuel can be obtained. One useful measure for evaluating the front end of the diesel fuel is using the 5% initial boiling point and 95% final boiling point of the fuel as measured by ASTM D2887. In the present invention, the 5% initial boiling point of the fuel should be greater than 300 degrees F., preferably greater than 320 degrees F., more preferably greater than 340 degrees F., and most preferably greater than 375 degrees F. The 95% final boiling point of the diesel fuel composition of the present invention is greater than 600° F., preferably, greater than 675 degrees F., more preferred, greater than 725 F. Another measure for evaluating the volatility of the diesel fuel is the boiling point. Preferably the boiling point range of the diesel fuel composition of the present invention is from about 300° F. to about 730° F.

The flash point of the diesel fuel composition of the present invention has a flashpoint within diesel specifications. Preferably the flash point is greater than about 50° C., preferably, greater than about 55° C., more preferred greater than 60° C., even more preferred greater than about 70° C., and most preferred greater than 75° C. as measured by the Pensky-Martin closed cup method.

The cloud point refers to the temperature below which solids, such as wax, start to precipitate in the diesel fuel leading to a cloudy appearance. The cloud point is an important measure of the cold temperature characteristics of a diesel fuel. The diesel fuel of the present invention has a cloud point less than −12° C.

The diesel fuel composition of the present invention will be low in aromatic compounds. The feedstock prior to hydrotreating may contain a significant amount of aromatic species. For example, the feedstock prior to hydrotreatment may contain at least 5% aromatics. The feedstock may contain at least 10% aromatics or the feedstock may contain at least 20% aromatics. During hydrotreatment, the aromatics can be, at least in part, converted to napthenes by hydrodearomatization reactions. In accordance with the present invention, the naphthene content of the diesel fuel composition of the present invention is greater than 5%. The naphthenes may be formed from hydrodearomatization of the feedstock during hydrotreatment or the naphthenes may be present in the feedstock prior to hydrotreatment as long as the diesel fuel composition of the present invention has a naphthene content of greater than 5%.

In one embodiment of the present invention, the diesel fuel composition comprises a sulfur content of less than 6 ppm, a flash point of greater than or equal to 60° C., a nitrogen content of less than 10 ppm, a 5% distillation point of greater than 300° F. and a 95% distillation point of greater than 600° F., a cloud point of less than −12° C., a naphthene content of greater than 5%, and an aromatic content, as given by $A_{total}$, of less than 1.5.

In another embodiment of the present invention, the diesel fuel composition comprises a sulfur content of less than 6 ppm, a flash point of greater than or equal to 60° C., a nitrogen content of less than 10 ppm, a 5% distillation point of greater than 300° F. and a 95% distillation point of greater than 600° F., a cloud point of less than −12° C., a naphthene content of greater than 5%, and an aromatic content, as given by $A_{total}$, of less than 1.0.

In another embodiment of the present invention, the diesel fuel composition comprises a sulfur content of less than 6 ppm, a flash point of greater than or equal to 60° C., a nitrogen content of less than 10 ppm, a 5% distillation point of greater than 300° F. and a 95% distillation point of greater than 600° F., a cloud point of less than −12° C., a naphthene content of greater than 5%, and an aromatic content, as given by $A_{total}$, of less than 0.8.

The diesel fuel of the present invention, in addition to the characteristics noted above, may, in some embodiments, comprise other characteristics such as viscosity. The viscosity is a measure of the resistance to flow of the diesel fuel, and it will decrease as the diesel fuel oil temperature increases. If the diesel fuel is used in a diesel engine, for example, the viscosity of the diesel fuel must be low enough to flow freely at its lowest operational temperature, yet high enough to provide lubrication to any moving parts in the engine. Viscosity also will determine the size of the fuel droplets, which, in turn, govern the atomization and penetration qualities of the fuel injector spray. In one embodiment, the diesel fuel of the present invention may have a viscosity at 40° C. of less than 4.1 mm/cSt as measured by ASTM D445-64.

The diesel fuel of the present invention, may, in some embodiments, comprise other characteristics such as net heat of combustion as determined by ASTM D4868. Preferably the diesel fuel of the present invention will have a net heat of combustion greater than 18,000 Btu/lb and more preferably more than 18,500 Btu/lb. It should be noted that viscosity and net heat of combustion describe the characteristics of some embodiments of the diesel fuel composition of the present invention. Not all embodiments of the diesel fuel composition of the present invention need to possess one or more of these physical characteristics. Moreover, the physical characteristics outside the preferred ranges are still within the scope of the invention as described and claimed herein.

If desired, the diesel fuel composition of the present invention may include additives to improve the lubricity of the diesel fuel composition. When used in a diesel engine, for example, some diesel fuels, especially low sulfur content fuels, offer limited protection against engine wear. The wear occurs to the injector needle due to rubbing contact with the surface of its container. Also, various parts of fuel pumps such as internal gears and cams are subject to wear due to fuel related problems. In some embodiments, to increase the diesel fuel lubricity, one or more lubricity enhancing additives can be mixed with the diesel fuel. Typically, the concentration of the lubricity enhancing additive in the fuel falls in the range of from about 1 to about 50,000 ppm, preferably about 10 to about 20,000 ppm, and more preferably from about 25 to about 10,000 ppm. Any lubricity enhancing additives can be used. These lubricity enhancing additives include, but are not limited to, fatty alcohols, fatty acids, amines, ethoxylated amines, borated esters, other esters, phosphates, phosphites, phosphonates, and mixtures thereof.

Method of Making the Diesel Fuel Composition

As discussed herein, several hydrotreating or hydrogenation or both methods (generally, hydroconversion method) may be employed to produce a diesel composition having low or no odor. A suitable hydroconversion method is determined based upon the aromatic content of the hydrocarbonaceous feedstock.

In one embodiment, both a hydrotreating catalyst (base metal) and a hydrogenation catalyst (noble metal) are employed to produce the diesel composition described hereinabove.

A hydrocarbonaceous feedstock having at least 50 ppm sulfur and at least 25 percent by weight aromatic content is fed to a hydrotreater over a hydrotreating catalyst thereby producing a hydrotreated product.

Hydrotreating catalysts are suitable for hydroconversion of feedstocks containing high amounts of sulfur, nitrogen and/or aromatic-containing molecules. Such catalysts generally contain at least one metal component selected from non-noble Group VIII (CAS Notation) or at least one metal component selected from the Group VIB (CAS notation) elements or mixtures thereof. Group VIB elements include chromium, molybdenum and tungsten. Group VIII elements include iron, cobalt and nickel. The amount(s) of metal component(s) in the catalyst suitably range from about 0.5% to about 25% by weight of Group VIII metal component(s) and from about 0.5% to about 25% by weight of Group VIB metal component(s), calculated as metal oxide(s) per 100 parts by weight of total catalyst, where the percentages by weight are based on the weight of the catalyst before sulfiding. The metal components in the catalyst may be in the oxidic and/or the sulphidic form. If a combination of at least a Group VI B and a Group VIII metal component is present as (mixed) oxides, it may be subjected to a sulfiding treatment prior to proper use in hydrotreating. Suitably, the catalyst comprises one or more components of nickel and/or cobalt and one or more components of molybdenum and/or tungsten.

The hydrotreating catalyst particles of this invention are suitably prepared by impregnating, blending, or co-mulling, active sources of the aforementioned metals with a support or binder. Examples of suitable supports or binders include silica, alumina, clays, zirconia, titania, magnesia and silica-alumina. Preference is given to the use of alumina as a support or a binder or both. Other components, such as phosphorous, may be added as desired to tailor the catalyst particles for a desired application. When co-mulling, the blended components are then shaped, such as by extrusion, dried and calcined at temperatures up to 1200° F. (649° C.) to produce the finished catalyst particles. Alternatively, equally suitable methods of preparing the amorphous catalyst particles include preparing oxide binder particles, such as by extrusion, drying and calcining, followed by depositing the aforementioned metals on the oxide particles, using methods such as impregnation. The catalyst particles, containing the aforementioned metals, are then further dried and calcined prior to use as a hydrotreating catalyst.

Suitable hydrotreating catalysts generally comprise a metal component, suitably Group VIB or VIII metal, for example cobalt-molybdenum, nickel-molybdenum, on a porous support, for example silica, silica-alumina, alumina or mixtures thereof. Examples of suitable hydrotreating catalysts are the commercial ICR 106, ICR 120 of Chevron Research and Technology Co.; DN-200 of Criterion Catalyst Co.; TK-555 and TK-565 of Haldor Topsoe A/S; HC-K, HC-P, HC-R and HC-T of UOP; KF-742, KF-752, KF-846, KF-848 STARS and KF-849 of AKZO Nobel/Nippon Ketjen; and HR-438/448 of Procatalyse SA.

Catalysts used in carrying out hydrotreating operations are well known in the art. See, for example, U.S. Pat. Nos. 4,347,121 and 4,810,357 for general descriptions of hydrotreating, and typical catalysts used in hydrotreating processes.

The hydrotreating catalyst employed in the present invention is selected from the group consisting of a nickel-molybdenum catalyst, a nickel-tungsten catalyst, a molybdenum-tungsten catalyst, a nickel-molybdenum-tungsten catalyst and a molybdenum-cobalt catalyst. Preferably, the catalyst employed is a nickel-molybdenum catalyst on an alumina support.

The hydrotreated product is then fed to at least one separation unit and separated into at least two product streams: a first product stream and a second product stream. Preferably, the hydrotreated product is separated into a naphtha product stream, a jet product stream, and a heavy product stream. Typically, the second product stream or the heavy product stream has a sulfur content that is less than 50 ppm by weight. Preferably, the hydrotreated product is fed to at least two separation units, one of which includes a distillation column. The heavy product stream is then fed to a hydrogenation reactor system. The heavy product stream is fed to the hydrogenation reactor system over a noble metal hydrogenation catalyst, thereby producing a hydrogenated product. Optionally, an isomerization catalyst may be added to the hydrogenation reactor system to control cloud point. The hydrogenated product is then fed to at least one separation unit thereby producing a naphtha product stream, a jet product stream and a diesel product stream. Preferably, the hydrogenated product is fed to at least one separation unit, one of which may include a distillation column, thereby producing a diesel product stream having an aromatic content of less than 7.5 percent by weight, a sulfur content of less than 10 ppm, and a flash point of greater than 50 degrees Celsius.

Suitable hydrogenation catalysts generally comprise Group VIII noble metals or oxides thereof. Platinum catalyst or palladium catalyst or mixtures thereof may be employed. Optionally, a reduced Group VIII base metal, such a nickel, may be employed as the hydrogenation catalyst.

Figure 5:
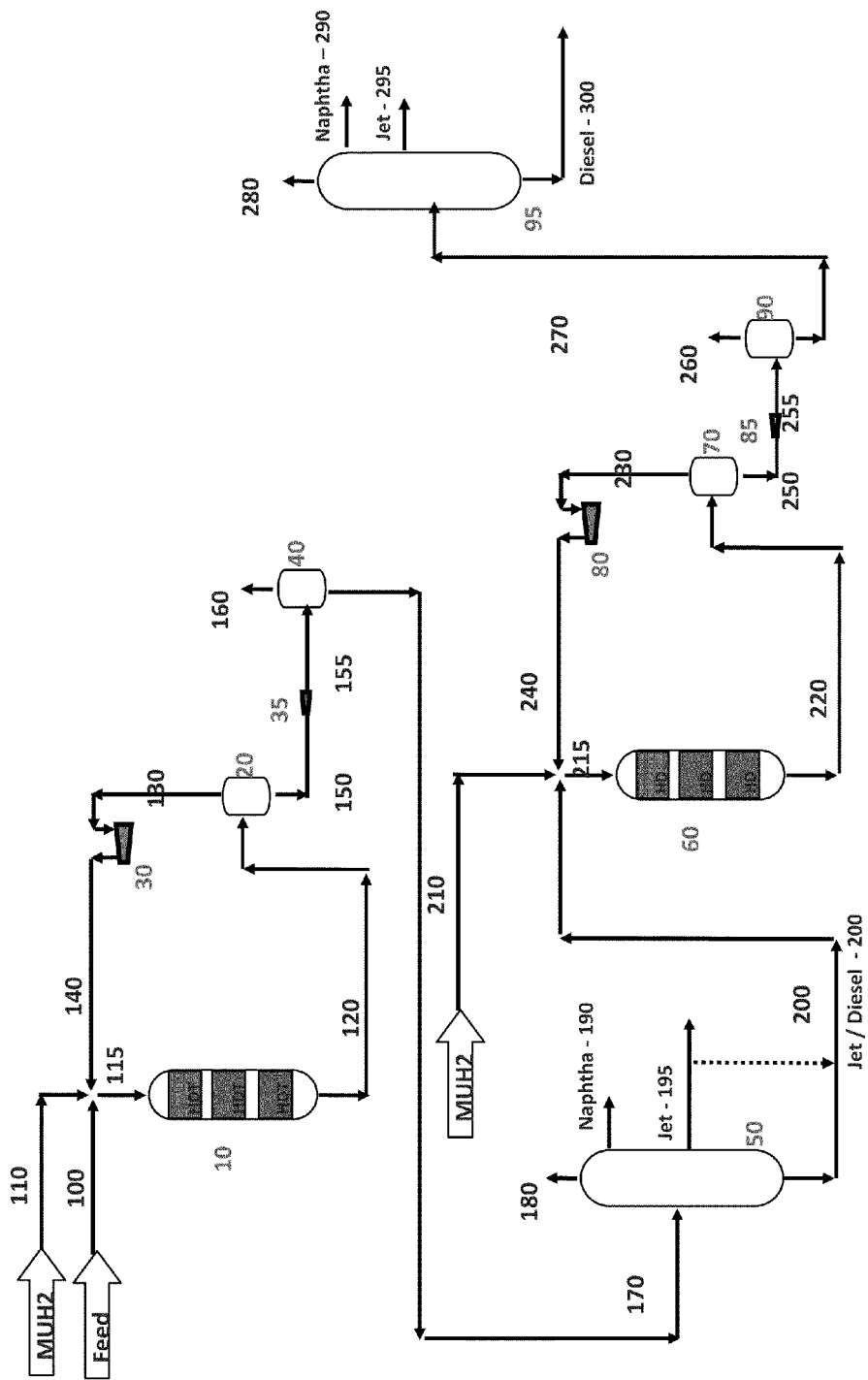
FIG. 5 depicts a process of making an odorless diesel fuel composition.

FIG. 5 further depicts a process of making an odorless diesel fuel composition. FIG. 5 illustrates a hydrocarbonaceous feed, entering the process through stream 100, combined with stream 110 comprising make-up hydrogen and combined with stream 140 which comprises recycled hydrogen to form stream 115. Hydrogen in stream 140 is prepared by compressing the high pressure separator 20 gas effluent stream 130.

Stream 115 is heated prior to entering the first stage hydroprocessing unit, vessel 10. Vessel 10 is preferably operated as a hydrotreater where the hydrocarbonaceous feed's sulfur is removed to very low levels, preferably <100 ppm, more preferably less than 50 ppm, most preferably <20 ppm. The feed flows downward through at least one bed of catalyst. Preferably, the feed flows through more than one bed of catalyst.

Hydrotreated effluent exits vessel 10 through stream 120 and is flashed in the high pressure separator, vessel 20. This vessel is a simple flash drum, separating the liquid hydrocarbon from the hydrogen rich recycle gas stream 130. The recycle gas stream 130 is compressed by the recycle gas compressor 30 and recycled to the hydrotreater reactor 10 inlet.

The high pressure liquid effluent stream 150 is reduced in pressure valve 35 to low pressure, typically, below 60 psig, to form stream 155. Stream 155 is flashed in the low pressure separator, vessel 40. This vessel is a simple flash drum separating the liquid hydrocarbon (stream 170) from the product gases (stream 160).

The liquid effluent stream 170 is heated and separated into several streams including, but not limited to, a diesel or diesel/jet stream in stripper 50 to remove the light gases (stream 180) and naphtha (stream 190). As an option, the product jet fuel, i.e., having a jet fuel boiling point range, (stream 195) can either be stripped in stripper 50 or combined with the diesel (stream 200) boiling range material in stream 200 to produce a jet/diesel stream.

The diesel or the jet/diesel stream 200 is pumped to hydrogenation pressure and combined with stream 210 comprising make-up hydrogen and with stream 240 comprising recycled hydrogen to form stream 215. Hydrogen in stream 240 is prepared by compressing the high pressure separator gas effluent stream 230.

Stream 215 is heated prior to entering the hydrogenation unit, vessel 60. Vessel 60 is preferably operated as a hydrogenation unit, preferably charged with high activity, noble base metals, where the hydrocarbon feed's aromatics are saturated to the levels require to make the diesel product odorless. The feed flows downward through at least one or more catalyst beds.

Typically, the catalyst employed in the hydrogenation unit comprises noble metals supported on silica or alumina or silica alumina or combinations of these supports. The catalyst cracking activity may be enhanced by adding zeolites to the catalysts.

Hydrogenated effluent exits vessel 60 through stream 220 and is flashed in the high pressure separator, vessel 70. This vessel is a simple flash drum, separating the liquid hydrocarbon from the hydrogen rich recycle gas stream 230. The recycle gas stream 230 is compressed with the recycle gas compressor 80 to the pressure of the hydrogenation reactor inlet.

The high pressure liquid effluent stream 250 is reduced in pressure (valve 85) to a low pressure, typically below 60 psig, to form stream 255. Stream 255 is flashed in the low pressure separator, vessel 90. This vessel is a simple flash drum separating the liquid hydrocarbon (stream 270) from the product gases (stream 260).

The liquid effluent stream 270 is heated and separated into at least two streams. To remove the light gases (stream 280), the liquid effluent stream is separated in stripper 95 into (1) naphtha (stream 290), (2) jet fuel (stream 300) and (3) an odorless diesel product (stream 310). By removing the lighter components in the stripper, the flash point is raised to meet the odorless diesel limitation of 50° C.

In one embodiment, a hydrocarbonaceous feedstock, having at least 50 ppm sulfur, is fed to a first reactor system (e.g., a hydrtotreating unit) over a hydrtrotreating catalyst as described hereinabove, thereby producing a hydrotreated product. The catalyst system in the hydrotreating step takes places in a reactor that that has at least two reactor beds. The first reactor bed comprises at least two catalyst layers comprising a hydrotreating catalyst layer and a hydrotreating/hydrogenation/hydrocracking catalyst layer. Optionally, a hydrodemetallization layer may also be employed in the first reactor bed. The hydrotreated product is then fed to a second reactor bed which comprises at least two layers. Preferably, the second reactor bed comprises a hydrotreating/hydrogenation/hydrocracking catalyst layer, a hydrocracking layer and a hydrotreating layer. The hydrotreated product is fed through second reactor bed over the catalysts layers, thereby producing a hydrocracked product.

The hydrocracking catalyst employed is typically a base metal containing catalyst. In general, the hydrocracking catalyst comprises a cracking component and a hydrogenation component on an oxide support material or binder. The cracking component may include an amorphous cracking component and/or a zeolite, such as a Y-type zeolite, an ultrastable Y type zeolite, or a dealuminated zeolite. A suitable amorphous cracking component is silica-alumina.

The hydrogenation component of the hydrocracking catalyst is selected from those elements known to provide catalytic hydrogenation activity. At least one metal component selected from the Group VIIIB (CAS Notation) elements and/or from the Group VIB (CASNotation) elements are generally chosen. Group VIB elements include chromium, molybdenum and tungsten. Group VIIIB elements include iron, cobalt, and nickel. The amount(s) of hydrogenation component(s) in the catalyst suitably range from about 0.5% to about 30% by weight of Group VIIIB metal component(s) and from about 0.5% to about 25% by weight of Group VIB metal component(s), calculated as metals per 100 parts by weight of total catalyst, where the percentages by weight are based on the weight of the catalyst before sulfiding. The hydrogenation components in the catalyst may be in the oxidic and/or the sulphidic form. If a combination of at least a Group VIB and a Group VIIIB metal component is present as (mixed) oxides, it will be subjected to a sulfiding treatment prior to proper use in hydrocracking Suitably, the catalyst comprises one or more components of nickel and/or cobalt and one or more components of molybdenum and/or tungsten. Catalysts containing nickel and molybdenum or nickel and tungsten are particularly preferred.

The hydrocracking catalyst particles of this invention may be prepared by impregnating, blending, or co-mulling, active sources of hydrogenation metals with a binder. Examples of suitable binders include silica, alumina, clays, zirconia, titania, magnesia and silica-alumina. Preference is given to the use of alumina as binder. Other components, such as phosphorous, may be added as desired to tailor the catalyst particles for a desired application. The blended components are then shaped, such as by extrusion, dried and calcined at temperatures up to 1200° F. (649° C.) to produce the finished catalyst particles. Alternatively, equally suitable methods of preparing the amorphous catalyst particles include preparing oxide binder particles, such as by extrusion, drying and calcining, followed by depositing the hydrogenation metals on the oxide particles, using methods such as impregnation. The catalyst particles, containing the hydrogenation metals, are then further dried and calcined prior to use as a hydrocracking catalyst.

The hydrocracked product is then fed to at least one separation unit and separated into at least two product streams. Preferably, the hydrocracked product is separated into a first product stream and a second product stream. The first product stream has a boiling point range of from about 80° F. to about 450° F. The second product stream has a boiling point range of from about 450° F. to about 900° F. The second product stream is then fed to at least one reactor. Preferably, the second product stream is fed to at least two reactors, a first and second reactor. The first reactor comprises at least one catalyst layer. Preferably, the first reactor comprises at least two catalysts layers which comprise a hydrogenation catalyst and an isomerization de-waxing catalyst to convert the paraffins into iso-paraffins, thereby producing a de-waxed product stream. The de-waxed product stream is then fed to the second reactor, a hydrofinishing reactor, thereby producing a hydrofinished effluent product stream.

Typically, the isomerization catalyst comprises intermediate pore size catalysts. The term "intermediate pore size" refers to an effective pore aperture in the range of from 5.3 angstroms to 6.5 angstroms when the porous inorganic oxide is in the calcined form. Molecular sieves having pore apertures in this range tend to have unique molecular sieving characteristics. Unlike small pore zeolites such as erionite and chabazite, they will allow hydrocarbons having some branching into the molecular sieve void spaces. Unlike larger pore zeolites, such as the faujasites and mordenites, they can differentiate between n-alkanes and slightly branched alkanes, and larger branched alkanes having, for example, quaternary carbon atoms.

The effective pore size of the molecular sieves can be measured using standard adsorption techniques and hydrocarbonaceous compounds of known minimum kinetic diameters. See Breck, Zeolite Molecular Sieves. 1974 (especially Chapter 8); Anderson, et al., J. Catalysis 58,114 (1979); and U.S. Pat. No. 4,440,871, the pertinent portions of which are incorporated herein by reference.

In performing adsorption measurements to determine pore size, standard techniques are used. It is convenient to consider a particular molecule as excluded if it does not reach at least 95% of its equilibrium adsorption value on the molecular sieve in less than about 10 minutes (p/po=0.5; 25° C.).

Intermediate pore size molecular sieves will typically admit molecules having kinetic diameters of 5.3 to 6.5 angstroms with little hindrance. Examples of such compounds (and their kinetic diameters in angstroms) are: n-hexane (4.3), 3-methylpentane (5.5), benzene (5.85), and toluene (5.8). Compounds having kinetic diameters of about 6 to 6.5.ANG. can be admitted into the pores, depending on the particular sieve, but do not penetrate as quickly and in some cases are effectively excluded. Compounds having kinetic diameters in the range of 6 to 6.5.ANG. include: cyclohexane (6.0), 2,3-dimethylbutane (6.1), and m-xylene (6.1). Generally, compounds having kinetic diameters of greater than about 6.5.ANG. do not penetrate the pore apertures and thus are not absorbed into the interior of the molecular sieve lattice. Examples of such larger compounds include: o-xylene (6.8), 1,3,5-trimethylbenzene (7.5), and tributylamine (8.1).

The preferred effective pore size range is from about 5.5 to about 6.2.ANG.

It is essential that the intermediate pore size molecular sieve catalysts used in the practice of the present invention have a very specific pore shape and size as measured by X-ray crystallography. First, the intracrystalline channels must be parallel and must not be interconnected. Such channels are conventionally referred to as 1-D diffusion types or more shortly as 1-D pores. The classification of intrazeolite channels as 1-D, 2-D and 3-D is set forth by R. M. Barrer in Zeolites, Science and Technology, edited by F. R. Rodrigues, L. D. Rollman and C. Naccache, NATO ASI Series, 1984 which classification is incorporated in its entirety by reference (see particularly page 75). Known 1-D zeolites include cancrinite hydrate, laumontite, mazzite; mordenite and zeolite L.

None of the above listed 1-D pore zeolites, however, satisfies the second essential criterion for catalysts useful in the practice of the present invention. This second essential criterion is that the pores must be generally oval in shape, by which is meant the pores must exhibit two unequal axes referred to herein as a minor axis and a major axis. The term oval as used herein is not meant to require a specific oval or elliptical shape but rather to refer to the pores exhibiting two unequal axes. In particular, the 1-D pores of the catalysts useful in the practice of the present invention must have a minor axis between about 3.9.ANG. and about 4.8.ANG. and a major axis between about 5.4.ANG. and about 7.0.ANG. as determined by conventional X-ray crystallography measurements.

The most preferred intermediate pore size silicoaluminophosphate molecular sieve for use in the process of the invention is SAPO-11. SAPO-11 comprises a molecular framework of corner-sharing [$SiO_2$] tetrahedra, [$AlO_2$] tetrahedra and [$PO_2$] tetrahedra, [i.e., ($S_x Al_y P_z$)$O_2$ tetrahedral units]. When combined with a Group VIII metal hydrogenation component, the SAPO-11 converts the waxy components to produce a lubricating oil having excellent yield, very low pour point, low viscosity and high viscosity index. SAPO-11 is disclosed in detail in U.S. Pat. No. 5,135,638, which is hereby incorporated by reference for all purposes.

Other intermediate pore size silicoaluminophosphate molecular sieves useful in the process of the invention are SAPO-31 and SAPO-41, which are also disclosed in detail in U.S. Pat. No. 5,135,638.

Also useful are catalysts comprising an intermediate pore size nonzeolitic molecular sieves, such as ZSM-22, ZSM-23 and ZSM-35, and at least one Group VIII metal. X-ray crystallography of SAPO-11, SAPO-31, SAPO-41, ZSM-22, ZSM-23 and ZSM-35 shows these molecular sieves to have the following major and minor axes: SAPO-11, major 6.3.ANG., minor 3.9.ANG.; (Meier, W. H., Olson, D. H., and Baerlocher, C., Atlas of Zeolite Structure Types, Elsevier, 1996), SAPO-31 and SAPO-41, believed to be slightly larger than SAPO-11, ZSM-22, major 5.5.ANG., minor 4.5.ANG. (Kokotailo, G. T., et al, Zeolites, 5, 349 (85)); ZSM-23, major 5.6.ANG., minor 4.5.ANG.; ZSM-35, major 5.4.ANG., minor 4.2.ANG. (Meier, W. M. and Olsen, D. H., Atlas of Zeolite Structure Types, Butterworths, 1987).

The intermediate pore size molecular sieve may be used in admixture with at least one Group VIII metal. Preferably the Group VIII metal is selected from the group consisting of at least one of platinum and palladium and optionally, other catalytically active metals such as molybdenum, nickel, vanadium, cobalt, tungsten, zinc and mixtures thereof. More preferably, the Group VIII metal is selected from the group consisting of at least one of platinum and palladium. The amount of metal ranges from about 0.01% to about 10% by weight of the molecular sieve, preferably from about 0.2% to about 5% by weight of the molecular sieve. The techniques of introducing catalytically active metals into a molecular sieve are disclosed in the literature, and preexisting metal incorporation techniques and treatment of the molecular sieve to form an active catalyst such as ion exchange, impregnation or occlusion during sieve preparation are suitable for use in the present process. Such techniques are disclosed in U.S. Pat. Nos. 3,236,761; 3,226,339; 3,236,762; 3,620,960; 3,373,109; 4,202,996; 4,440,781 and 4,710,485 which are incorporated herein by reference.

The term "metal" or "active metal" as used herein means one or more metals in the elemental state or in some form such as sulfide, oxide and mixtures thereof. Regardless of the state in which the metallic component actually exists, the concentrations are computed as if they existed in the elemental state.

The catalyst may also contain metals, which reduce the number of strong acid sites on the catalyst and thereby lower the selectivity for cracking versus isomerization. Especially preferred are the Group IIA metals such as magnesium and calcium.

It is preferred that relatively small crystal size catalyst be utilized in practicing the invention. Suitably, the average crystal size is no greater than about 10.mu., preferably no more than about 5.mu., more preferably no more than about 1.mu. and still more preferably no more than about 0.5.mu.

Strong acidity may also be reduced by introducing nitrogen compounds, e.g., NH.sub.3 or organic nitrogen compounds, into the feed; however, the total nitrogen content should be less than 50 ppm, preferably less than 10 ppm. The physical form of the catalyst depends on the type of catalytic reactor being employed and may be in the form of a granule or powder, and is desirably compacted into a more readily usable form (e.g., larger agglomerates), usually with a silica or alumina binder for fluidized bed reaction, or pills, prills, spheres, extrudates, or other shapes of controlled size to accord adequate catalyst-reactant contact. The catalyst may be employed either as a fluidized catalyst, or in a fixed or moving bed, and in one or more reaction stages.

The intermediate pore size molecular sieve catalyst can be manufactured into a wide variety of physical forms. The molecular sieves can be in the form of a powder, a granule, or a molded product, such as an extrudate having a particle size sufficient to pass through a 2-mesh (Tyler) screen and be retained on a 40-mesh (Tyler) screen. In cases wherein the catalyst is molded, such as by extrusion with a binder, the silicoaluminophosphate can be extruded before drying, or, dried or partially dried and then extruded.

The molecular sieve can be composited with other materials resistant to temperatures and other conditions employed in the isomerization process. Such matrix materials include active and inactive materials and synthetic or naturally occurring zeolites as well as inorganic materials such as clays, silica and metal oxides. The latter may be either naturally occurring or in the form of gelatinous precipitates, sols or gels including mixtures of silica and metal oxides. Inactive materials suitably serve as diluents to control the amount of conversion in the isomerization process so that products can be obtained economically without employing other means for controlling the rate of reaction. The molecular sieve may be incorporated into naturally occurring clays, e.g., bentonite and kaolin. These materials, i.e., clays, oxides, etc., function, in part, as binders for the catalyst. It is desirable to provide a catalyst having good crush strength because in petroleum refining, the catalyst is often subjected to rough handling. This tends to break the catalyst down into powder-like materials which cause problems in processing.

Naturally occurring clays which can be composited with the molecular sieve include the montmorillonite and kaolin families, which families include the sub-bentonites, and the kaolins commonly known as Dixie, McNamee, Georgia and Florida clays or others in which the main mineral constituent is halloysite, kaolinite, diokite, nacrite or anauxite. Fibrous clays such as halloysite, sepiolite and attapulgite can also be use as supports. Such clays can be used in the raw state as originally mined or initially subjected to calcination, acid treatment or chemical modification.

In addition to the foregoing materials, the molecular sieve can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-titania, silica-alumina-magnesia and silica-magnesia-zirconia. The matrix can be in the form of a cogel.

The catalyst used in the process of this invention can also be composited with other zeolites such as synthetic and natural faujasites, (e.g., X and Y) erionites, and mordenites. It can also be composited with purely synthetic zeolites such as those of the ZSM series. The combination of zeolites can also be composited in a porous inorganic matrix.

As discussed above, a de-waxed product stream results from contacting the second product stream with an isomerization catalyst. The de-waxed product stream is fed to at least one reactor comprising a noble metal hydrogenation catalyst as described hereinabove. The de-waxed product stream is hydrofinished thereby producing a hydrofinished product stream. The hydrofinished product stream is then fed to at least one separation unit and separated into a naptha product stream, a jet product stream, a diesel product stream and at least one base oil product stream. Preferably, the hydrofinished product stream is then fed to at least one separation unit and separated into a naphtha product stream, a jet product stream, a diesel product stream, a first base oil product stream and a second base oil product stream. Preferably, the hydrofinished product stream is fed to at least two separation units, one of which includes a distillation column, and separated into a naphtha product stream, a jet product stream, a diesel product stream and at least one base oil product stream, preferably at least two base oil product streams, a first base oil product stream and a second base oil product stream. The diesel product stream has an aromatic content of less than 7.5 percent by weight, a UV@272 nm+10*UV@310 nm of less than 1.5, a sulfur content of less than 10 ppm and a flash point of greater than 50° C.

Figure 6:
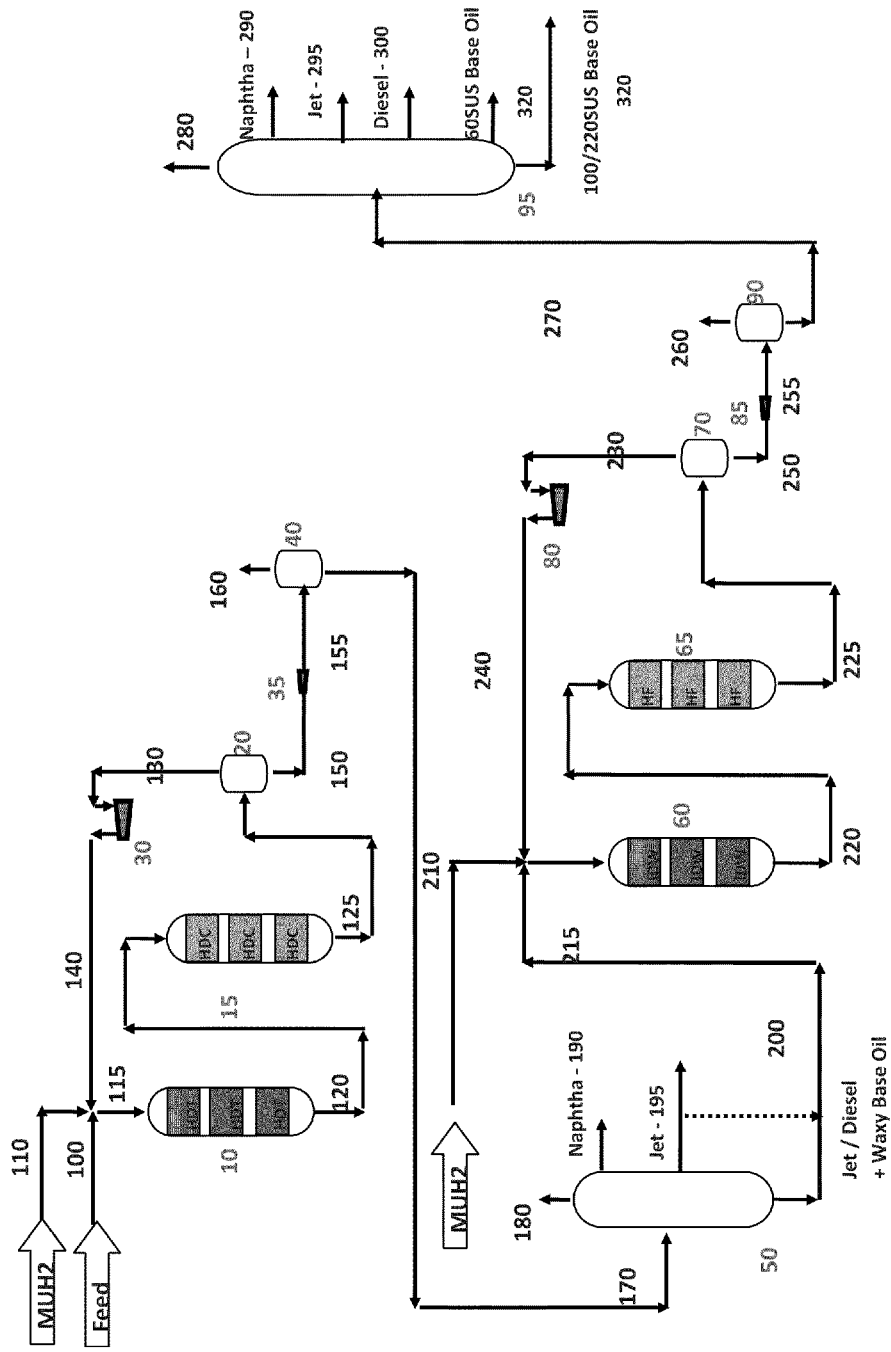
FIG. 6 depicts one embodiment of a process of making an odorless diesel fuel composition.

FIG. 6 further depicts one embodiment of a process of making an odorless diesel fuel composition. FIG. 6 illustrates a hydrocarbonaceous feed having a boiling point range of 550 F to 1000 F. The feed, stream 100, is combined with stream 110, which comprises make-up hydrogen, and with stream 140, which comprises recycled hydrogen, to form stream 115. Hydrogen in stream 140 is prepared by compressing the high pressure separator 20 gas effluent stream 130.

Stream 115 is heated prior to entering the first stage hydroprocessing unit, vessel 10. Vessel 10 is preferably operated as a hydrotreater where the hydrocarbonaceous feed's sulfur content if decreased to very low levels. Preferably, the sulfur content is less than 100 ppm. More preferred, the sulfur content is less than 50 ppm and most preferred, the sulfur content is less than 20 ppm. The feed flows downward through at least one or more beds of catalyst, thereby producing a hydrotreated product.

The hydrotreated effluent product exits vessel 10 through stream 120 and is introduced to a second reactor system, a hydrocraker unit, vessel 15. Vessel 15 is preferably operated at hydrocracking operating conditions where the effluent's viscosity index is improved to the viscosity index levels associated with lubricant oils, preferably from about 98 to about 150. The hydrotreated effluent product is contacted with a hydrocracking catalyst, thereby producing a hydrocracked product.

The hydrocracked effluent product exits vessel 15 through stream 125 and is flashed in the high pressure separator, vessel 20. This vessel is a simple flash drum, separating the liquid hydrocarbon from the hydrogen rich recycle gas stream 130. The recycle gas stream 130 is compressed in the recycle gas compressor 130 and recycled to the hydrotreater reactor 10 inlet.

The high pressure liquid effluent stream 150 is fed through valve 35 and reduced in pressure to a low pressure, typically below 60 psig, to form stream 155. Stream 155 is flashed in the low pressure separator, vessel 40. This vessel is a simple flash drum separating the liquid hydrocarbon, stream 170, from the product gases, stream 160.

The liquid effluent stream 170 is heated and separated into at least two product streams in stripper 50 in order to separate the light end gases from those product streams having a higher boiling point. The separated product streams may include (1) a waxy base oil, (2) a waxy base oil/diesel stream, (3) jet fuel, stream 195, (4) light end gases, stream 180, and (5) naphtha, stream 190. Optionally, the jet fuel product stream, stream 195, may either be stripped in stripper 50 or combined with the waxy base oil/diesel boiling range material in stream 200.

The waxy base oil/diesel or the jet/diesel/waxy base oil stream 200 is pumped to a pressure suitable for hydrogenation (e.g., 2000-2700 psi) and combined with stream 210, which comprises make-up hydrogen, and with stream 240, which comprises recycled hydrogen, to form stream 215. Hydrogen in stream 240 is prepared by compressing the high pressure separator 70 gas effluent stream 230.

Stream 215 is heated prior to entering the first stage of vessel 60. Vessel 60 is preferably operated as an isomerization de-waxing unit. Preferably the beds in the vessel 60 are charged with high activity, noble base metal catalysts, where the stream 200 is isomerized to the levels required to set the lubricant base oil pour point and as a result yields a de-waxed product, a diesel fuel composition with excellent cold flow properties.

Applicable catalyst for the isomerization dewaxing unit comprises noble metals supported over SM-3, SSZ-32 or ZSM-5 or mixtures thereof supported on alumina, silica, silica alumina or mixtures thereof.

Stream 220 is generally cooled prior to entering a second stage hydrofinishing reaction unit, vessel 65. Vessel 65 is preferably operated as a hydrogenation unit, preferably charged with high activity, noble base metal catalysts, where the dewaxed product's aromatic and olefinic hydrocarbons are hydrogenated to the levels required to meet diesel fuel specifications, including a low odor. The feed flows downward through at least one or more beds of catalyst.

Applicable catalysts for the hydrofinishing unit comprise of noble metals, such as platinum, palladium, and, optionally, high levels of a reduced Group VIII base metal such as nickel, supported over alumina, silica, silica alumina or mixtures thereof.

The hydrofinished effluent product stream exits vessel 65 through stream 225 and is flashed in the high pressure separator, vessel 70. This vessel is a simple flash drum, separating a liquid hydrocarbon effluent stream from the hydrogen rich recycle gas stream 230. The recycle gas stream 230 is fed to the recycle gas compressor 80, where it is compressed and fed to the isomerization dewaxing reactor.

The high pressure liquid hydrocarbon effluent stream 250 is reduced in pressure (valve 85) to a low pressure, typically below 60 psig, to form stream 255. Stream 255 is flashed in the low pressure separator, vessel 90. This vessel is a simple flash drum separating liquid hydrocarbon effluent, stream 270, from product gas effluent, stream 260.

The liquid hydrocarbon effluent stream 270 is heated and separated in stripper 95 into a finished lubricating base oil, stream 320, diesel product stream 310, jet product stream 295, naphtha product stream 290, and light gases stream 280. By removing the lighter components in the stripper, the flash point is raised to meet the odorless diesel limitation of greater than 50 degrees C.

In one embodiment of the present invention, a hydrocarbonaceous feedstock having at least 50 ppm sulfur and at least 7.5 percent by weight aromatic content is fed to a reactor system (e.g., hydrogenating unit) which contains high activity base metal catalysts to hydrogenate the hydrocarbonaceous feedstock, thereby hydrogenating the hydrocarbonaceous feedstock and producing a hydrogenated product stream. The hydrogenated product stream is fed to at least one separation unit, thereby separating the hydrogenated product stream into at least two separate product streams. Preferably, the hydrogenated product stream is separated in at least two separation units, one of which includes a distillation column. Preferably, the hydrogenated product stream is separated into at least a naphtha product stream, a jet product stream and a diesel product stream. The diesel product stream has an aromatic content of less than 7.5 percent by weight, a sulfur content of less than 10 ppm, and a flash point of greater than 50 degrees C.

Preferably, the high activity base metal catalysts employed in this embodiment comprises Group VI base metal and Group VIII noble metal supported on an alumina, silica, alumina-silica, other inorganic oxide or zeolite support. Preferably, the catalyst comprises at least 5 wt % Group VIII and 5 wt % Group VI metals. More preferred, the catalyst comprises 6 wt % Ni and 19 wt % Tungsten. Most preferred, the catalyst comprises 20 wt % Ni and 20 wt % Tungsten, and the reactor system has a pressure of at least 1000 psi.

The hydrogenation component of the catalyst can a base metal and can be impregnated into the inorganic oxide, the zeolite or both. In this application, the term "base metal" includes one or more of nickel, cobalt, tungsten or molybdenum. Usually, a combination of base metals are used, such as nickel or cobalt in combination with tungsten or molybdenum, and the base metal is usually sulfided or presulfided in the catalyst when or before the catalyst is put on stream. The term "impregnation" shall mean the addition to a solid of a volume of solution not substantially greater than that which can be absorbed by the solid, and allowing the solution to be absorbed by or on the solid, followed, without an intermediate washing step, by the drying of the solution onto the solid.

Figure 7:
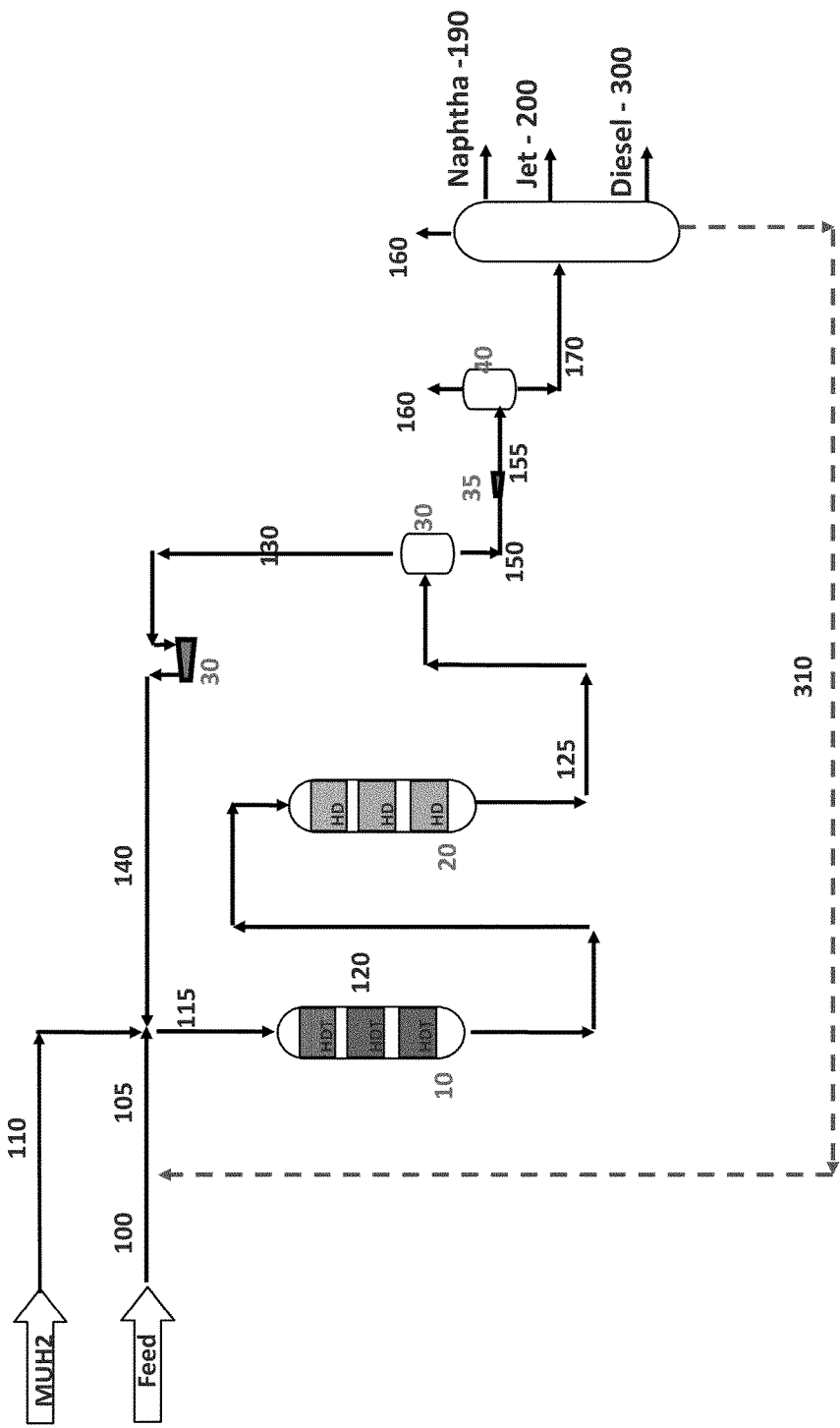
FIG. 7 depicts one embodiment of a process of making an odorless diesel fuel composition.

FIG. 7 further depicts one embodiment of a process of making an odorless diesel fuel composition. FIG. 7 illustrates a sulfur containing hydrocarbonaceous feedstock stream 100 which may be combined with a recycle diesel stream 310 to form stream 105 which is then combined with stream 110 which comprises make-up hydrogen and with stream 140 which comprises recycled hydrogen to form stream 115. Hydrogen in stream 140 is prepared by compressing the high pressure separator 20 gas effluent, stream 130.

Stream 115 is heated prior to entering the first stage hydroprocessing unit, vessel 10. Vessel 10 is preferably operated as a hydrotreater for the removal of both feed sulfur and nitrogen contained in the feedstock.

Suitable catalysts employed in the hydrotreater comprise Group VI base metals, Group VIII noble metals, or mixtures thereof supported on silica, alumina, alumina/silica or mixtures thereof. Optionally, the catalyst cracking activity may be enhanced by adding zeolites. Stream 115 is contacted with the aforementioned catalyst(s), thereby producing a hydrotreated product stream effluent.

The hydrotreated product stream effluent exits vessel 10 through stream 120 and enters vessel 20 which is preferably operated as a hydrogenation unit, thereby producing a hydrogenated product stream effluent. Preferably, the hydrogenation unit is charged with relatively high levels of high activity, base metals catalyst, where the hydrotreated product stream's aromatic content is saturated to the levels required to make the diesel fuel product low in odor, (i.e., an aromatic content of less than 7.5 percent by weight). The feed flows downward through at least one or more beds of catalyst.

The hydrogenated product effluent stream exits vessel 20 through stream 125 and is flashed in the high pressure separator, vessel 30. This vessel is a simple flash drum, separating the liquid hydrocarbon from the hydrogen rich recycle gas stream 130. The recycle gas stream 130 is compressed in the recycle gas compressor and recycled to the hydrogenation reactor.

The high pressure liquid effluent stream 150 is fed through valve 35 and is reduced in pressure (valve 35) to a low pressure, typically below 60 psig to form stream 155. Stream 155 is flashed in the low pressure separator, vessel 40. This vessel is a simple flash drum separating a liquid hydrocarbon effluent steam (stream 170) from the product gases (stream 160).

The liquid hydrocarbon effluent stream 170 is heated and separated into a diesel product stream or diesel/jet stream product stream in stripper 50 to remove the light gases (stream 180), a naphtha product stream (stream 190), jet fuel product stream (stream 200) and a diesel product stream (Stream 300), having a low odor. Optionally, a portion of the diesel product stream, stream 310, may be recycled back to the hydrotreater reactor, hydrogenation reactor or both for improved saturation. By removing the lighter components in the stripper, the flash point is raised to meet the odorless diesel limitation of greater than 50 degrees C.

In one embodiment of the present invention, a hydrocarbonaceous feedstock, having less than 100 ppm sulfur and at least 7.5 percent by weight aromatic content, is fed to a reactor system (e.g., hydrogenation unit) which contains high activity noble metal catalysts, thereby hydrogenating the hydrocarbonaceous feedstock and producing a hydrogenated product. Preferably, the high activity noble metal catalyst comprises at least one Group VIII noble metal, such as platinum, palladium or mixtures thereof. More preferred, the high activity noble metal catalyst comprises greater than 0.5 wt % of at least one noble metal. Most preferred, the high activity noble metal catalyst comprises at least 0.5 wt % platinum, at least 0.5 wt % palladium or mixtures thereof. The hydrogenated product is separated in at least one separation unit, thereby producing at least two separated product streams. Preferably, the hydrogenated product is separated in at least two separation units, one of which includes a distillation column. Preferably, the separated product stream is separated into at least a naphtha product stream, a jet product stream and a diesel product stream. The diesel product stream has an aromatic content of less than 7.5 percent by weight, a sulfur content of less than 10 ppm and a flash point of greater than 50 degrees C.

Preferably, the high activity noble metal catalysts employed in this embodiment comprises a noble metal that can be impregnated into the inorganic oxide, the zeolite or both. In this application, the term "noble metal" includes one or more of ruthenium, rhodium, palladium, osmium, iridium or platinum. The term "impregnation" shall mean the addition to a solid of a volume of solution not substantially greater than that which can be absorbed by the solid, and allowing the solution to be absorbed by or on the solid, followed, without an intermediate washing step, by the drying of the solution onto the solid.

Figure 8:
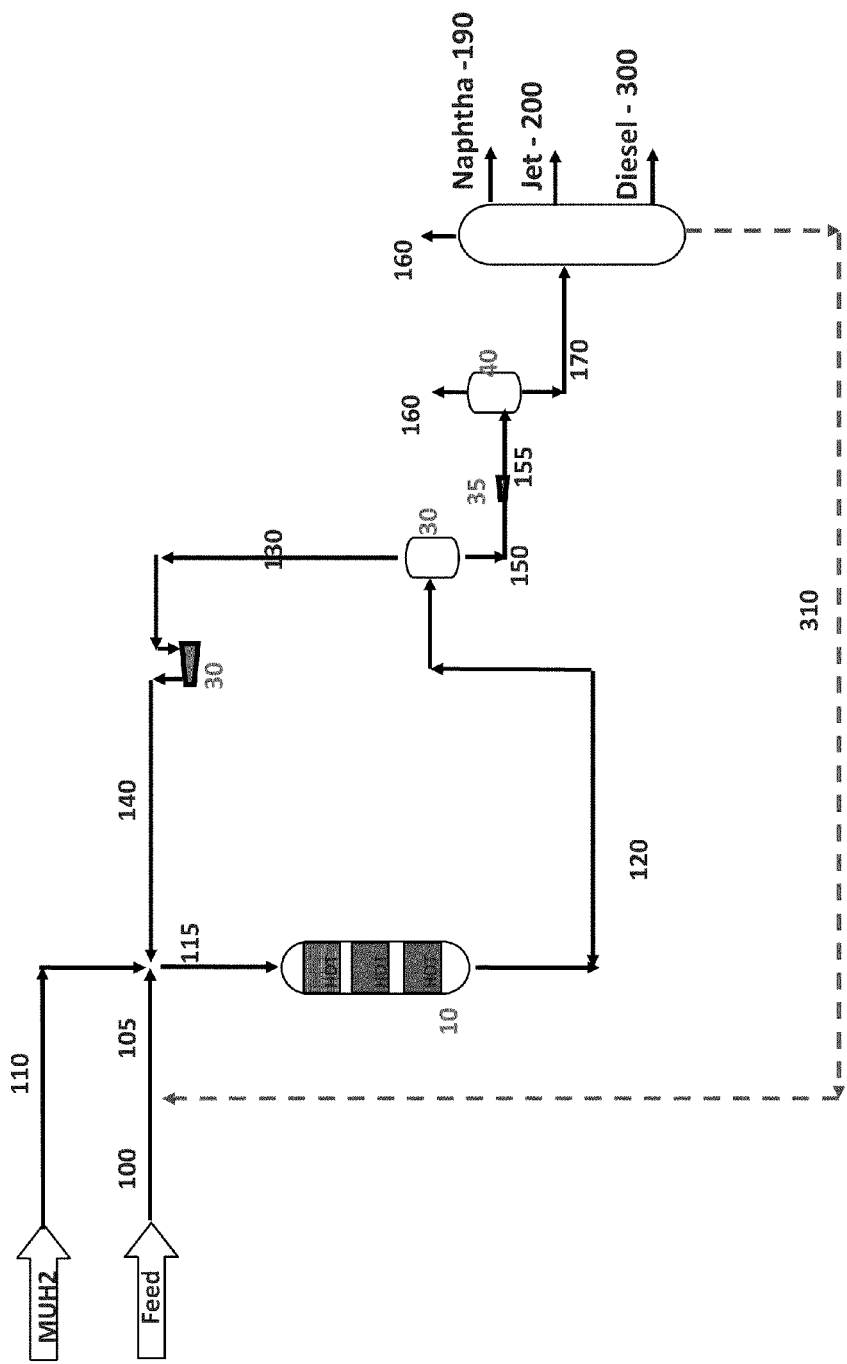
FIG. 8 further depicts another embodiment of the process for making an odorless diesel fuel composition.
Figure 9:
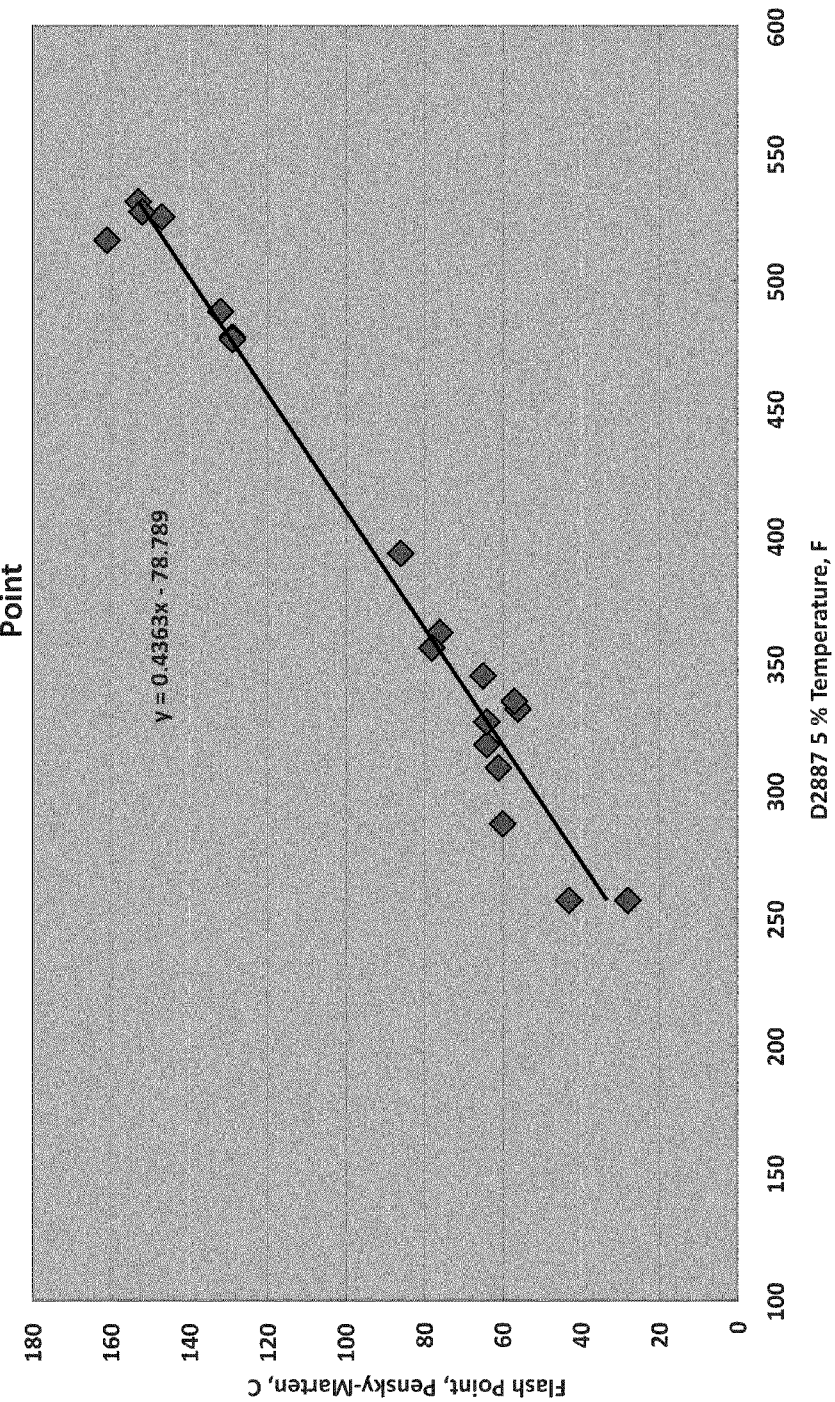
FIG. 9 depicts the correlation between odor, aromatic content and flash point.

FIG. 8 further depicts another embodiment of the process for making an odorless diesel fuel composition.

FIG. 8 illustrates a low sulfur hydrocarbonaceous feedstock, preferably, having a sulfur content of less than 50 ppm. More preferred, the sulfur content is less than 15 ppm. The feedstock, stream 100, may be combined with a recycle diesel stream 310 to form stream 105 which is then combined with stream 110, which comprises make-up hydrogen, and with stream 140, which comprises of recycle hydrogen, thereby forming stream 115. Hydrogen in stream 140 is prepared by compressing the high pressure separator 20 gas effluent stream 130.

Stream 115 is heated prior to entering a hydrogenation reactor, vessel 10. Vessel 10 is preferably operated at hydrogenation operating conditions that are useful for obtaining aromatic saturation.

Suitable catalysts for the hydrogenation reactor are noble base metals supported on supports comprising silica, alumina, silica alumina or mixtures thereof. The catalyst cracking activity may be enhanced by adding zeolites, which have been described herein. The hydrocarbonaceous feedstock is fed to the hydrogenation reactor over the catalyst, thereby producing a hydrogenated product effluent stream.

The hydrogenated product effluent stream exits vessel 10 through stream 120 and is flashed in the high pressure separator, vessel 30. This vessel is a simple flash drum, separating the hydrogenated liquid effluent product stream into a hydrocarbon stream and a hydrogen rich recycle gas stream 130. The recycle gas stream 130 is compressed in the recycle gas compressor 30 and recycled to the hydrogenation reactor inlet.

The high pressure liquid effluent stream 150 is reduced in pressure (valve 35) to low pressure, typically below 60 psig to form a low pressure liquid effluent stream, stream 155. Stream 155 is flashed in the low pressure separator, vessel 40. This vessel is a simple flash drum separating the liquid effluent stream into a liquid product effluent stream (stream 170) and a product gas (stream 160).

The liquid hydrocarbon effluent stream 170 is heated and separated into a diesel product stream or diesel/jet stream product stream in stripper 50 to remove the light gases (stream 180), a naphtha product stream (stream 190), jet fuel product stream (stream 200) and a diesel product stream (Stream 300), having a low odor. Optionally, a portion of the diesel product stream, stream 300, may be recycled back to the hydrotreater reactor/hydrogenation reactor or both for improved saturation. By removing the lighter components in the stripper, the flash point is raised to meet the odorless diesel limitation of greater than 50 degrees C.

Odorless Diesel Benefits

It has also been discovered that use of the odorless diesel fuel, produced from the processes as described herein, provides decreased soot in a combustion chamber compared to soot produced in a combustion chamber when conventional ultra low sulfur diesel is employed.

One embodiment of the invention is directed to a method of reducing soot in an internal combustion engine by employing a diesel fuel composition produced by the processes described herein.

Another embodiment of the present invention is directed to a method reducing soot in an internal combustion engine by employing a diesel fuel composition, wherein the diesel fuel composition has a (1) sulfur content of less than 10 ppm; (2) a flash point of greater than 50° C.; (3) a UV absorbance, $A_{tota}$, of less than 1.5 as determined by the formula comprising $$A_{total}=A_x+10(A_y)$$

wherein $A_x$ is the UV absorbance at 272 nanometers; and wherein $A_y$ is the UV absorbance at 310 nanometers;
(4) a naphthene content of greater than 5 percent; (5) a cloud point of less than −12° C.;
(6) a nitrogen content of less than 10 ppm; and (7) a 5% distillation point of greater than 300 F and a 95% distillation point of greater than 600 F.

It may be deemed that there is a reduction in particulate matter when the odorless diesel of the present invention is employed.

Other embodiments will be obvious to those skilled in the art.

The following examples are presented to illustrate specific embodiments of this invention and are not to be construed in any way as limiting the scope of the invention.

EXAMPLES

Example 1

Example 1 corresponds to FIG. 5. The following process was followed to produce the odorless diesel as illustrated in FIG. 5. A hydrocarbonaceous feedstock having 10260 ppm sulfur, a boiling range of about 257 F to about 759 F and an aromatic content of 31 percent by weight, as measured by SFC (supercritical fluid chromatography ASTM D5186) method, was fed to a reactor, which comprised a catalyst system, having a liquid hourly space velocity (LHSV) of 3.0 l/Hr. The catalyst system comprised hydrotreating catalysts selected containing a Group VI and Group VIII metals catalysts, which was promoted with phosphorus, on a large surface area alumina, non-acidic support. The total metals were 20 wt %. Specifically, the hydrotreating catalyst comprise nickel and molybdenum, promoted with phosphorus and supported on alumina. The temperature of the hydrotreating reactor was 659 F. 320 scf of hydrogen was consumed. 4700 scfb of hydrogen was recycled to the hydrotreater. The average pressure of the hydrogen was 860 psi. The hydrotreated product was then fed to a hydrogenation unit which comprised a hydrogenation catalyst. The hydrogenation catalyst comprised platinum/palladium on a silica/alumina support. The temperature of the hydrogenation reactor was 580 F. 420 scf of hydrogen was consumed. 2915 scfb was recycled to the hydrogenation reactor. The average pressure of the hydrogen was 1363 psi.

As shown in Table 1, the two stage reaction process resulted in a hydrocarbon product having an odor of less <0.5 and a non-detectable percent of aromatics in the product stream, which has a boiling range of from about 403 F to about 768.

TABLE 1

Two Stage Process, Base Metal for Sulfur Removal followed by Single Stage
Process with High Activity Noble Metal Catalysts for Aromatic Saturation

| | ID: | | | |
|---|---|---|---|---|
| | Hydrotreater Feed Conditions | Hydrotreater Effluent Conditions | Hydrogenation Reactor Feed Conditions | Hydrogenation Reactor Effluent Conditions |
| Operating Conditions | Diesel Hydrotreater | | Diesel Hydrogenation | |
| Pressure, psig | | 950 | | 1600 |
| H2 Pressure Avg, psi | | 860 | | 1363 |
| LHSV, 1/Hr | | 3.0 | | 3.0 |
| Reactor Temperature, F. | | 659 | | 580 |
| Recycle Hydrogen, SCFB | | 4700 | | 2915 |
| H2 Consumption, SCFB | | 320 | | 420 |
| Yields: | | | | |
| Jet. Vol. % | 0.0 | 3.7 | 0.0 | 22.4 |
| Diesel. Vol % | 100.0 | 80.5 | 100.0 | 80.5 |
| Odor Scale | >5.0 | >5.0 | >5.0 | <0.5 |

TABLE 1-continued

Two Stage Process, Base Metal for Sulfur Removal followed by Single Stage
Process with High Activity Noble Metal Catalysts for Aromatic Saturation

| Operating Conditions | ID: | | | |
| --- | --- | --- | --- | --- |
| | Hydrotreater Feed Conditions | Hydrotreater Effluent Conditions | Hydrogenation Reactor Feed Conditions | Hydrogenation Reactor Effluent Conditions |
| | Diesel Hydrotreater | | Diesel Hydrogenation | |
| Inspections | | | | |
| API Gravity | 34.3 | 38.1 | 38.1 | 39.1 |
| Sulfur, PPM | 10260 | <6 | <6 | <6 |
| Viscosity, cSt @ 40 C. | 3.709 | 3.400 | 3.400 | — |
| Cloud Point, C. | −5 | −5 | −5 | −10 |
| UV Absorbance: | | | | |
| UV@272 + 10UV@310 | 12.6567 | 1.8774 | 1.8774 | 0.0038 |
| Cetane Index | 52.2 | 59.1 | 59.1 | 60.3 |
| Aromatics, % | 31.0 | 27.3 | 27.3 | — |
| Mono aromatics | 23.9 | 23.9 | 23.9 | — |
| Polynuclear Aromatics | 6.4 | 6.4 | 6.4 | — |
| Flash Point, Calc C. | 103 | 77 | 77 | 120 |
| Aniline Point, F. | 157 | 170 | 170 | 192 |
| Net Heat of Combustion, D4523, KBTU/lb | 18,460 | 18,660 | 18,660 | 18,742 |
| Distillation, D2887 | | | | |
| IBP/5% | 257/416 | 271/357 | 271/357 | 403/455 |
| 10/30% | 472/547 | 397/503 | 397/503 | 482/542 |
| 50% | 579 | 561 | 561 | 577 |
| 70/90% | 617/673 | 606/684 | 606/684 | 618/682 |
| 95/EP | 698/759 | 721/759 | 721/759 | 711/768 |
| Characterization Factor, Kw | 11.89 | 12.17 | 12.17 | 12.23 |

Example 2

Example 2 corresponds to FIG. 6. The following process was followed to produce the odorless diesel as illustrated in FIG. 6. A hydrocarbonaceous feedstock was hydrotreated by feeding the hydrocarbonaceous feedstock into a first reactor which comprised several catalysts layers dispersed in two reactor beds, thereby producing hydrotreated product. In the first reactor bed, the first layer comprised a demetallization catalyst which comprised nickel and molybdenum and was promoted with phosphorus. The second layer comprised hydrotreating layer as described in Example 1. The third layer comprised a hydrotreating/hydrogenation/hydrocracking catalyst which comprised nickel/molybdenum and was promoted with phosphorus on an alumina support. The hydrotreated product, which was the hydrocracking feedstock, had at least 19600 ppm sulfur, a boiling range of about 594 F to about 971 F. The hydrocracking feedstock was fed to the second reactor bed reactor, which comprised a catalyst system, having a liquid hourly space velocity (LHSV) of 0.7 l/Hr. In the second reactor bed, the first catalyst layer comprised a hydrotreating/hydrogenation/hydrocracking catalyst which comprised nickel/molybdenum and was promoted with phosphorus on an alumina support. The second layer comprised a hydrocracking catalyst which comprised nickel/molybdenum/y-zeolite on a silica/alumina support. The third layer comprised another hydrotreating catalyst layer as described herein. The temperature of the hydrocracking section of the reactor was 724 F. The average pressure of the hydrogen was 2700 psi. And, the gas recycle rate was 5000 scfb. The hydrocracked product, which had a boiling point range of from about 600 F to about 1010 F was separated into two products: a waxy 220 N product and a waxy 100 N product. The waxy 220 N product had a boiling point range of from about 640 F to about 1010 F and the waxy 100 N product had a boiling point range of from about 600 F to about 920 F. The waxy 100 N product was then fed to the de-waxing reactor which had a temperature of 625 F, thereby producing a de-waxed product. The de-waxing reactor comprised a catalyst comprising platinum and 60 wt % SSZ-32 on an alumina support. The de-waxed product was then fed to a hydrofinishing reactor which comprised a platinum/palladium catalyst on a silica/alumina support and had a temperature of 494 F. The hydrofinishing product had a boiling point range of from about 240 F to about 900 F. The hydrofinishing product was separated into at least 3 product streams:

(1) a 100 N base oil having a boiling point range of from about 595 F to about 900 F; (2) a 60 N base oil having a boiling point range of from about 540 F to about 710 F; and (3) an odorless diesel product having a boiling point range of from about 250 F to about 665 F.

As shown in Table 2, the hydrocracker/de-waxing/hydrofinishing reaction process resulted in hydrocarbon product having an odor of <0.5 and less than 0.5 weight percent of aromatics in the product stream, which has a boiling range of from about 255 F to about 660.

The odorless diesel product may be additized with a lubricity additive dissolved in xylene at a concentration that does not add odor to the diesel product.

TABLE 2

Multi-Stage Process for Aromatic Saturation and Production of Odorless Diesel

| Operation | Hydrocracker | | | De-waxer/Hydrofinisher | | |
|---|---|---|---|---|---|---|
| Operating Conditions | | | | | | |
| Pressure, psig | 2700 | | | 2750 | | |
| LHSV, 1/Hr | 0.7 | | | 1.9 | | |
| Recycle Gas Rate SCFB | 5000 | | | 3000 | | |
| Temperatures, F. | | | | 375 | | |
| Hydrocracker | 724 | | | — | | |
| IDW | — | | | 625 | | |
| HF | — | | | 494 | | |
| Yields, % | | | | | | |
| Odorless Diesel | — | | | 3.2 | | |
| Lube Oil, 60N | — | | | 7.5 | | |
| 100N (Waxy 100) | (32) | | | 79.1 | | |
| Waxy 220 | (47) | | | — | | |
| Stream: | HDC Feed | Waxy 220 Product | Waxy 100 Product/ DW Feed | 100N Product | 60N Product | Odorless Diesel/ Product |
| Inspections: | | | | | | |
| Odor Scale | — | — | — | — | — | <0.5 |
| UV@272 + 10 UV@310 | — | — | — | — | — | 0.0023 |
| Flash Point, Calc. C. | — | — | — | 210 | 178 | 81 (78) |
| API Gravity | 23.0 | 32.8 | 34.4 | 33.7 | 32.5 | 39.0 |
| Sulfur, PPM | 19600 | 19 | 5 | <0.5 | <0.5 | <0.5 |
| Nitrogen, PPM | 896 | 1.1 | 0.1 | 0.1 | 0.1 | 0.1 |
| Pour Point, C. | — | — | — | −14 | −20 | −37 |
| Cloud Point, C. | — | — | — | −12 | −25 | −45 |
| Cetane Index | 34 | 44 | 53 | 52 | 52 | 59 |
| Aromatics, % | — | — | — | — | — | <0.5 |
| Mono aromatics | — | — | — | — | — | <0.5 |
| Polynuclear Aromatics | — | — | — | — | — | <0.5 |
| Viscosity, cSt | | | | | | |
| @ 40 C. | — | — | — | 20.9 | 9.4 | 3.27 |
| @ 100 C. | 7.780 | 5.675 | 3.625 | 4.165 | — | — |
| VI | 67 | 120 | 110 | 101 | 60 | — |
| Distillation, D2887 | | | | | | |
| IBP/5% | 594/672 | 649/719 | 604/650 | 601/661 | 545/589 | 255/366 |
| 10/30% | 700/756 | 745/795 | 671/717 | 683/728 | 605/637 | 404/508 |
| 50% | 792 | 829 | 752 | 761 | 656 | 567 |
| 70/90% | 825/870 | 861/905 | 783/826 | 791/831 | 671/686 | 599/630 |
| 95/EP | 892/971 | 826/1006 | 845/914 | 848/891 | 692/703 | 641/660 |
| K Factor | 11.79 | 12.66 | 12.53 | 12.50 | 12.05 | 12.18 |

HDC: Hydrocracker
DW: Dewaxing

Example 3

Examples 3A and 3B correspond to FIG. 7. The following process, which exemplifies Example 3A, was followed to produce the odorless diesel as illustrated in FIG. 7. A hydrocarbonaceous feedstock having 10171 ppm sulfur, a boiling range of about 257 F to about 759 F and an aromatic content of at least 31 percent by weight, as measured by SFC (Supercritical Fluid Chromatography, ASTM D 5186), was fed to a reactor, which comprised a multi-layer catalyst system, having a liquid hourly space velocity (LHSV) of 0.52 l/Hr. A first layer of the multi-layer catalyst system comprised a nickel/molybdenum layer promoted by phosphorus on an alumina support. And, a second layer of the multi-layer catalyst system comprised a nickel/molybdenum/y-zeolite on a silica/alumina support. The temperature of the reactor was 673 F. 1660 scfb of hydrogen was consumed. 8640 scfb of hydrogen was recycled to the reactor. The average pressure of the reactor was 2254 psi. The feedstock was fed to the reactor over the aforementioned catalysts, thereby producing a reaction product. The reaction product was distilled into two streams: (1) a diesel product stream and (2) a naphtha/jet product stream. The diesel product stream had a sulfur content of 6 ppm; a total UV absorbance of 0.0052; a boiling point range of from 328 F to about 692 degrees F.; and a calculated flashpoint of 72 degrees C. from the front end distillation.

Example 3B exemplifies a second run of the single stage process using high activity base metal catalysts to produce odorless diesel. A hydrocarbonaceous feedstock having 10171 ppm sulfur, a boiling range of about 257 F to about 759 F and an aromatic content of at least 31 percent by weight, as measured by SFC (Supercritical Fluid Chromatography, ASTM D 5186), was fed to a reactor, which comprised a catalyst system, having a liquid hourly space velocity (LHSV) of 0.52 l/Hr. The catalyst system comprised a multi-layer catalyst system comprising four catalyst layers. The first layer comprised a nickel/molybdenum layer promoted by phosphorus on an alumina support. And, a second layer comprised a nickel/molybdenum/y-zeolite catalyst on a silica/alumina support. A third layer comprised a nickel/tungsten/y-zeolite catalyst on a silica/alumina support. And, a fourth layer comprised a nickel/molybdenum layer promoted by phosphorus on an alumina support. The temperature of the reactor was 673 F. 1710 scfb of hydrogen was consumed. 8610 scfb of hydrogen was recycled to the reactor. The average pressure of the reactor was 2254 psi. The feedstock was fed to the reactor over the aforementioned catalysts, thereby producing a reaction product. The reaction product was distilled into two streams: (1) a diesel product stream and (2) a naphtha/jet product stream. The diesel product stream had a sulfur content of 6 ppm; a total UV absorbance of 0.0047; a boiling point range of from 296 degrees F. to about 673 degrees F.; and a calculated flashpoint of 58 degrees C. from the front end distillation.

As shown in Table 3, the single stage reaction process resulted in a hydrocarbon product having an odor of less <0.5. The odorless diesel product may be additized with a lubricity additive dissolved in xylene at a concentration that does not add odor to the diesel product.

TABLE 3

Single Stage Process with High Activity Base Metal Catalysts

| ID: | Feed | Example 3A | | Example 3B | |
|---|---|---|---|---|---|
| Operating Conditions and Yields | | | | | |
| Operating Conditions | | | | | |
| Pressure, psig | | 2254 | | 2254 | |
| H2 Pressure Avg, psi | | 2058 | | 2060 | |
| LHSV, 1/Hr | | 0.52 | | 0.53 | |
| Reactor Temperature, F. | | 673 | | 673 | |
| Recycle Hydrogen, SCFB | | 8640 | | 8610 | |
| H2 Consumption, SCF | | 1660 | | 1710 | |
| Recovery, % | — | 103.5 | | 102.6 | |
| Yields: | | | | | |
| Hydrogen, Wt. % | | −2.36 | | −2.76 | |
| Hydrogen Sulfide, Wt. % | | 1.08 | | 1.08 | |
| Ammonia, wt. % | | 0.01 | | 0.01 | |
| Methane/Ethane, Wt. % | | 0.17 | | 0.16 | |
| Propane/Butane, Vol. % | | 16.5 | | 17.3 | |
| Lt. Naphtha, C5/C6, Vol % | | 15.5 | | 13.6 | |
| Naphtha/Jet, Vol. % | 0.0 | 42.3 | | 49.1 | |
| Diesel, Vol % | 100.0 | 45.1 | | 40.8 | |
| Total | 100.0 | 119.4 | | 120.8 | |
| Product: | Feed | Diesel | Naphtha/Jet | Diesel | Naphtha/Jet |
| Odor Scale | >5.0 | <0.5 | — | <0.5 | — |
| API Gravity | 34.3 | 42.7 | 43.4 | 41.3 | 41.3 |
| Sulfur, PPM | 10171 | <6 | <6 | <6 | <6 |
| Total UV Absorbance: | 12.6567 | 0.0052 | — | 0.0041 | — |
| UV@272 + 10UV@310 | | | | | |
| Flash Point, Calc. C. | 103 | 72 | — | 58 | — |
| Product Quality | | | | | |
| Inspections: | | | | | |
| Hydrogen, Wt. % | | −2.36 | | −2.76 | |
| Hydrogen Sulfide, Wt. % | | 1.08 | | 1.08 | |
| Ammonia, wt. % | | 0.01 | | 0.01 | |
| Methane/Ethane, Wt. % | | 0.17 | | 0.16 | |
| Propane/Butane, Vol. % | | 16.5 | | 17.3 | |
| Lt. Naphtha, C5/C6, Vol % | | 15.5 | | 13.6 | |
| Naphtha/Jet, Vol. % | 0.0 | 42.3 | | 49.1 | |
| Diesel, Vol % | 100.0 | 45.1 | | 40.8 | |
| Total | 100.0 | 119.4 | | 120.8 | |
| Product: | Feed | Diesel | Naphtha/Jet | Diesel | Naphtha/Jet |
| Yield, Vol. % | 100.0 | 45.1 | 42.3 | 40.8 | 49.1 |
| Odor Scale | 5.0 | <0.5 | — | <0.5 | — |
| API Gravity | 34.3 | 47.4 | | 49.3 | |
| Sulfur, PPM | 10171 | <6 | <6 | <6 | <6 |
| Cloud Point, C. | −5 | −10 | — | −17 | — |
| Aromatics, % | 31.0 | — | — | — | — |
| Mono aromatics | 19.9 | — | — | — | — |
| Polynuclear Aromatics | 11.1 | — | — | — | — |
| Total UV Absorbance: | 12.6567 | 0.0052 | — | 0.0047 | — |
| UV@272 + 10UV@310 | | | | | |
| Cetane Index | 52.2 | 67 | — | 61 | — |
| n-DM Analysis: | | | | | |
| Aromatic Carbon, % | 16.2 | 0.0 | 0.1 | 0.1 | 0.0 |
| Naphthenic Carbon, % | 24.0 | 20.6 | 38.1 | 24.7 | 34.0 |
| Parffinic Carbon, % | 59.8 | 79.4 | 61.8 | 75.2 | 66.0 |
| Flash Point, Calc C. | 103 | 72 | — | 58 | — |

TABLE 3-continued

Single Stage Process with High Activity Base Metal Catalysts

| ID: | Feed | Example 3A | | Example 3B | |
|---|---|---|---|---|---|
| Aniline Point, F. | 157 | 186 | — | 178 | — |
| Net Heat of Combustion, D4529, KBTU/lb | 18,455 | 18,890 | — | 18,890 | — |
| Distillation, D2887 | | | | | |
| IBP/5% | 257/416 | 328/345 | 132/169 | 296/314 | 85/149 |
| 10/30% | 472/547 | 361/418 | 193/237 | 325/370 | 171/218 |
| 50% | 579 | 488 | 258 | 429 | 247 |
| 70/90% | 617/673 | 549/600 | 288/318 | 516/577 | 270/293 |
| 95/EP | 698/759 | 626/692 | 328/344 | 601/673 | 298/344 |
| Characterization Factor, Kw | 11.89 | 12.45 | 11.96 | 12.31 | 12.08 |

Example 4

Examples 4A and 4B correspond to FIG. 8. The following process, which exemplifies Examples 4A and 4B, was followed to produce the odorless diesel as illustrated in FIG. 8. A hydrocarbonaceous feedstock was hydrotreated to decrease the sulfur content in the feedstock. The hydrotreating method employed was similar to the method described in Example 1. The hydrotreated product, which had a sulfur content of less than 6 ppm and a total UV absorbance of 1.8774, was fed to a catalyst system which comprised a high activity noble metal catalyst which comprised 0.5 wt % platinum and 0.5 wt % palladium, supported on a silica/alumina support. The temperature of the reactor was 580 F. 2915 scfb of recycle hydrogen gas was fed to the reactor. 420 scfb of hydrogen was consumed. The average pressure of the reactor was 1600 psi. The feedstock was fed to the reactor over the aforementioned catalyst, thereby producing a reaction product. The reaction product was distilled into two streams: (1) a diesel product stream and (2) a jet product stream. The diesel product stream had a sulfur content of less than 6 ppm; a total UV absorbance of 0.0038; a boiling point range of from 403 F to about 768 F; and a calculated flashpoint of 120 degrees C.

Example 4B exemplifies a second run of the process using the same base metal catalysts as in Example 4A to produce odorless diesel.

As shown in Table 4, the single stage reaction process resulted in a hydrocarbon product having an odor of less <0.5. The odorless diesel product may be additized with a lubricity additive dissolved in xylene at a concentration that does not add odor to the diesel product.

TABLE 4

Base Metals Catalyst used in Hydroprocessing to Produce Odorless Diesels

| ID: | 4A Feed | 4A Product | 4B Feed | 4B Product |
|---|---|---|---|---|
| Operating Conditions | | | | |
| Pressure, psig | | 1600 | | 1604 |
| H2 Pressure Avg, psi | | 1363 | | 1386 |
| LHSV, 1/Hr | | 3.0 | | 3.0 |
| Reactor Temperature, F. | | 580 | | 622 |
| Recycle Hydrogen, SCFB | | 2915 | | 3115 |
| H2 Consumption, SCF | | 420 | | 475 |
| Yields: | | | | |
| Jet. Vol. % | 0.0 | 22.4 | 0.0 | 11.9 |
| Diesel. Vol % | 100.0 | 80.5 | 100.0 | 90.5 |
| Odor Scale | 5.0 | <0.5 | 5.0 | <1.5 |
| Inspections | | | | |
| API Gravity | 38.1 | 39.1 | 38.8 | 40.1 |
| Sulfur, PPM | <6 | <6 | 6.2 | <6 |
| Viscosity, cSt @ 40 C. | 3.400 | — | 2.685 | — |
| Cloud Point, C. | −3 | — | −10 | — |
| UV Absorbance: | | | | |
| UV@272 + 10UV@310 | 1.8774 | 0.0038 | 2.0385 | 0.0110 |
| Cetane Index | 48.8 | 60.3 | 56.5 | 60.0 |
| Aromatics, % | 18.6 | — | 22.2 | — |
| Mono aromatics | 16.4 | — | 20.0 | — |
| Polynuclear Aromatics | 2.2 | — | 2.0 | — |
| Flash Point, Calc C. | 89 | 120 | 59 | 87 |
| Aniline Point, F. | 170 | 192 | 160 | 258 |
| Net Heat of Combustion, D4529, KBTU/lb | 18,589 | 18,742 | 18,620 | 18,965 |
| Distillation, D2887 | | | | |
| IBP/5% | 283/384 | 403/455 | 231/315 | 334/381 |
| 10/30% | 412/453 | 482/542 | 355/456 | 405/488 |

TABLE 4-continued

Base Metals Catalyst used in Hydroprocessing to Produce Odorless Diesels

| ID: | 4A Feed | 4A Product | 4B Feed | 4B Product |
|---|---|---|---|---|
| 50% | 484 | 577 | 538 | 500 |
| 70/90% | 497/534 | 618/682 | 588/657 | 597/661 |
| 95/EP | 552/627 | 711/768 | 684/750 | 687/752 |
| Characterization Factor, Kw | 11.78 | 12.23 | 11.70 | 12.19 |

Example 5

Example 5 corresponds to FIG. 8. The following process was followed to produce the odorless diesel as illustrated in FIG. 8. A hydrocarbonaceous feedstock having 6.2 ppm sulfur, a boiling range of about 231 F to about 750 F and an aromatic content of 22.2 percent by weight, as measured by SFC (Supercritical Fluid Chromatography, ASTM D5186), was fed to a reactor, which comprised a catalyst system, having a liquid hourly space velocity (LHSV) of 2.6 l/Hr. The catalyst system comprised the same high activity noble metal catalyst employed in Example 4. The temperature of the reactor was 603 F. 836 scfb of hydrogen was consumed. 3080 scfb of hydrogen was recycled to the reactor. The average pressure of the reactor was 1610 psi. The feedstock was fed to the reactor over the aforementioned catalyst, thereby producing a reaction product, Intermediate Products A and B. Intermediate Products A and B were the result of two separate runs. Both Intermediate Products A and B had a sulfur content of less than 6 ppm; a total UV absorbance of 0.0044 and 0.0031, respectively; a boiling point range of from 165 F to about 750 F and from about 135 to about 736, respectively; and a calculated flashpoint of 38 degrees C. and 32 degrees C., respectively. Intermediate product B was then fed to a distillation column wherein the distillation range was from about 317 F to about 744 degrees F., thereby producing an odorless diesel product which had a sulfur content of less than 6 ppm; a total UV absorbance of 0.0047; an aromatic content of less than 1.5; and a net heat of combustion, as determined by ASTM Method D4529, of 18,875 KBTU/lb.

The odorless diesel product may be additized with a lubricity additive dissolved in xylene at a concentration that does not add odor to the diesel product.

TABLE 5

Single Stage Process with High Activity Noble Metal Catalysts

Catalyst: Pt/Pd/Silica Alumina

| | ID: | | | |
|---|---|---|---|---|
| | Feed | Intermediate Product A | Intermediate Product B | Distillation |
| Operating Conditions | | | | |
| Pressure, psig | | 1610 | 1590 | |
| H2 Pressure Avg, psi | | 1489 | 1516 | |
| LHSV, 1/Hr | | 2.6 | 1.3 | |
| Reactor Temperature, F. | | 603 | 603 | |
| Recycle Hydrogen, SCFB | | 3080 | 3390 | |
| H2 Consumption, SCF | | 836 | 911 | |
| Yields: | | | | |
| Jet, Vol. % | 0.0 | 0.0 | 0.0 | 10.6 |
| Diesel, Vol % | 100.0 | 106.5 | 106.4 | 95.8 |
| Odor Scale | 5.0 | 3.0 | 2.5 | <1.5 |
| Inspections | | | | |
| API Gravity | 38.8 | 42.7 | 43.4 | 41.3 |
| Sulfur, PPM | 6.2 | <6 | <6 | <6 |
| Viscosity, cSt @ 40 C. | 2.685 | — | — | 2.953 |
| Cloud Point, C. | −10 | — | — | −9 |
| UV Absorbance: | | | | |
| UV@272 + 10UV@310 | 2.0385 | 0.0044 | 0.0031 | 0.0047 |
| Cetane Index | 56.5 | 60.9 | 60.5 | 61.0 |
| Aromatics, % | 22.2 | — | — | <1.0 |
| Mono aromatics | 20.0 | — | — | <0.5 |
| Polynuclear Aromatics | 2.0 | — | — | <0.5 |
| Flash Point, Calc C. | 59 | 43 | 38 | 77 |
| Aniline Point, F. | 160 | 177 | 177 | 182 |
| Net Heat of Combustion, D4529, KBTU/lb | 18,615 | 18,908 | 18,923 | 18,875 |
| Distillation, D2887 | | | | |
| IBP/5% | 231/315 | 169/279 | 135/268 | 317/357 |
| 10/30% | 355/456 | 327/424 | 312/411 | 379/468 |
| 50% | 538 | 513 | 499 | 538 |

TABLE 5-continued

Single Stage Process with High Activity Noble Metal Catalysts

Catalyst: Pt/Pd/Silica Alumina

| | ID: | | | |
|---|---|---|---|---|
| | Feed | Intermediate Product A | Intermediate Product B | Distillation |
| 70/90% | 588/657 | 576/646 | 566/638 | 587/653 |
| 95/EP | 684/750 | 674/740 | 670/736 | 680/744 |
| Characterization Factor, $K_w$ | 11.70 | 12.23 | 12.22 | 12.23 |

Example 6

19.7 mg of the odorless diesel fuel composition as prepared in Example 2 was injected into the combustion chamber. The fuel was injected into the combustion chamber for 7 seconds and then ignited with a spark plug. At the time of injection the pressure of the chamber was 1560 bar. The combustion chamber was filled with gas containing approximately 15% oxygen and the remainder comprises inert gas. The gas density in the combustion chamber was 22.8 kg/m3. The temperature of the combustion chamber was 1000 K; and the pressure of the combustion chamber was 60 bar. The combustion chamber was a one-cylinder version of a 4-stroke diesel engine. The injector was a second-generation Bosch Common-Rail and had a nozzle diameter (single hole) of 0.090 mm and a nozzle shape of KS1.5/0.86.

Measurements of the soot thickness were made in an optically accessible section of the combustion chamber. At the end of the combustion cycle, the odorless diesel fuel composition had the following results:

TABLE 6

Soot Thickness Results

| | Sample | |
|---|---|---|
| | No. 2 Ultra-Low Sulfur Diesel | Example 2 Odorless Diesel |
| $T_{10}$ (° C.) | 211 | 223 |
| $T_{90}$ (° C.) | 315 | 312 |
| Cetane Number | 46 | 59 |
| Aromatics Vol % | 27 | Less than 5 |
| Soot Optical Thickness, KL | 0 | 0 |
| @ 20 mm from nozzle | | |
| @ 30 mm from nozzle | 0.4 | 0.4 |
| @ 40 mm from nozzle | 1.8 | 1.4 |
| @48 mm from nozzle | 2.3 | 2.0 |

KL: kiloluminaires

As evidenced in Table 6, the odorless diesel, as prepared in Example 2, has less soot that results from the combustion of the odorless diesel than the soot that remains when ultra low sulfur diesel is combusted. Accordingly, it may be deemed that there is a reduction in particulate matter when the odorless diesel of the present invention is employed.

Example 7

Fuel Properties of Conventional Diesel and Invention Diesel Used in HCCI Engine

TABLE 7

| Fuel Property | Unit | Comparative Diesel #1 | Comparative Diesel #2 | Diesel of the Invention |
|---|---|---|---|---|
| UV, 272 nm + 10*310 nm | Abs/L/G/cm | 5.690 | 1.529 | 0.0026 |
| Density | g/mL | 0.8351 | 0.8462 | 0.835 |
| Distillation (ASTM D86) | | | | |
| Initial Boiling Point (IBP) | Degrees Fahrenheit | 341.4 | 373.8 | 378 |
| 10% Recovery Temperature | Degrees Fahrenheit | 379.7 | 430.5 | 451 |
| 50% Recovery Temperature | Degrees Fahrenheit | 459.6 | 531.8 | 567 |
| 90% Recovery Temperature | Degrees Fahrenheit | 605.3 | 617.3 | 611 |
| Cetane Number | | 58.5 | 58.5 | 58.5 |
| Heating Value (Net) | Btu/lb | 18607 | 18733 | 18500 |
| Sulfur | ppm wt. | <6 | 13 | <6 |
| Carbon | wt % | 85.9 | 86.7 | 86.1 |
| Hydrogen | wt % | 14.1 | 13.3 | 13.9 |
| Oxygen | wt % | 0 | 0 | 0 |

Example 8

Engine Test Conditions—Operated in Mild HCCI Advanced Combustion Mode

TABLE 8

| Engine Power | 125 kW @ 4000 RPM |
|---|---|
| Peak Torque | 300 Nm @ 1500-4000 RPM |
| Number and Arrangement of Cylinders | 4 cylinder in-line |
| Displacement | 1.995 L |
| Compression Ratio | 14.8 |
| Fuel Injection System | Common Rail |
| Turbocharger | VGT[2] |
| Exhaust Gas Recycle | Low pressure cooled EGR |

[2]Variable Geometry Turbocharger

Figure 2:
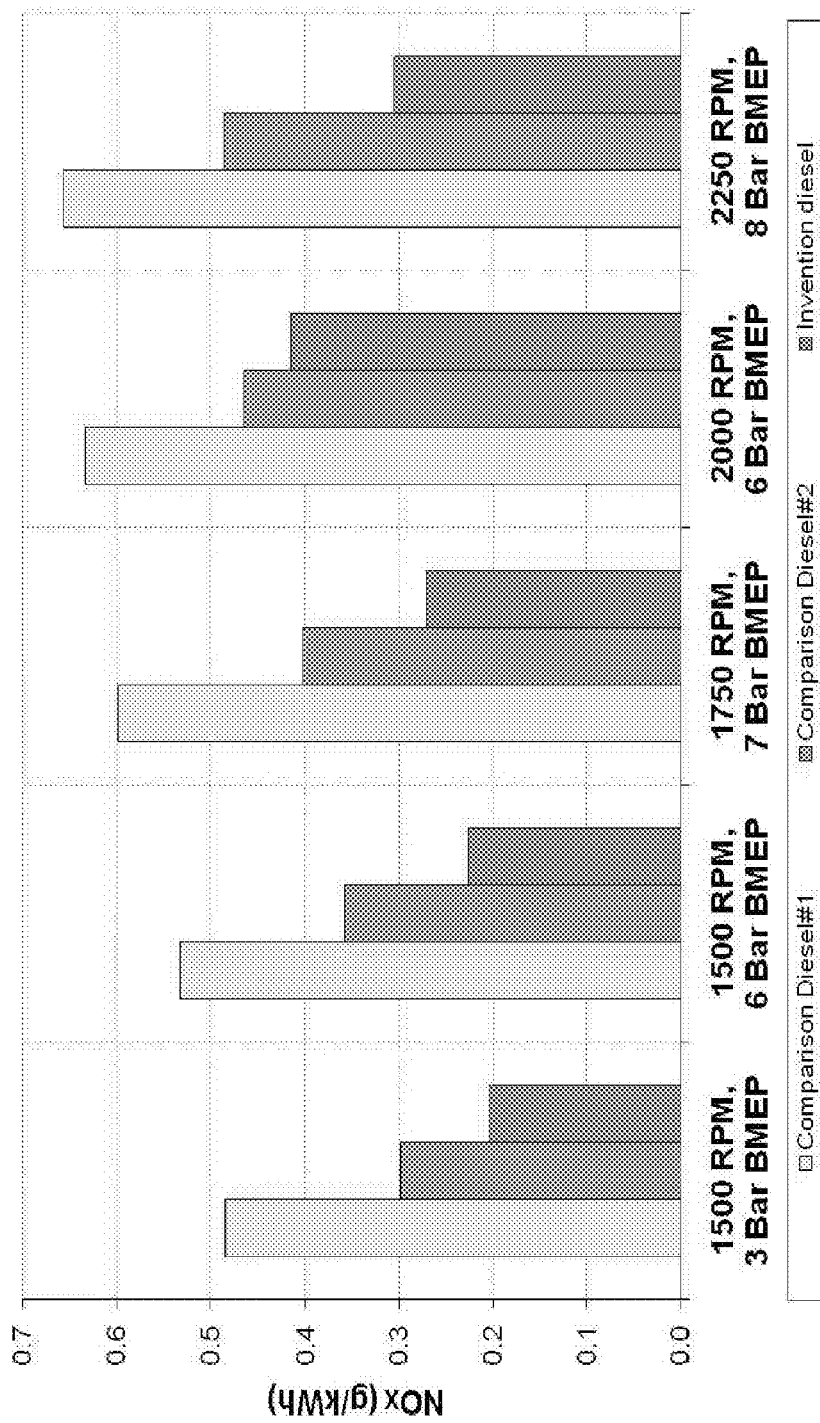
FIG. 2 depicts the nitrogen oxide emissions from an HCCI engine when the two comparative diesel fuels and the diesel fuel of the invention are employed.

FIG. 2 shows that the diesel fuel composition of the present invention has lower NOx emissions when employed in an HCCI advanced combustion engine. Two comparative fuels and the diesel fuel composition of the present invention were injected into an HCCI engine and operated under advanced combustion mode conditions.

The engine was operated in a range of about 1500-2250 RPM and an engine load of from about 3-8 Bar, BMEP.

Example 9

Fuel Properties of Conventional Diesel and Invention Diesel Used in Heavy Duty Detroit Diesel Engine Heavy Duty Detroit Diesel engine was operated at Federal Test Procedures operating conditions as outlined in 40 CFR 86.1333.

TABLE 9

|  | Comparison Diesel #3 | Comparison Diesel #4 | Invention Diesel |
|---|---|---|---|
| Density, 15.56° C. | 0.8379 | 0.8580 | 0.8350 |
| Sulfur, ppm (UVF) ASTM D5453 | <6 | <6 | <6 |
| Carbon, wt % | 85.9 | 87.5 | 86.1 |
| Hydrogen, wt % | 13.3 | 12.9 | 13.9 |
| SFC Aromatics, wt % | 21.0 | 35.7 | 2.0 |
| SFC PNA's[3] wt % | 3.6 | 7.3 | 0 |
| Derived Cetane Number, IQT | 55.6 | 41.6 | 58.5 |
| Heat of Combustion, Btu/lb, net | 18,470 | 18,213 | 18,500 |
| Distillation, ASTM D86, ° F. Initial Boiling Point | 352 | 345 | 378 |
| 10% | 464 | 428 | 451 |
| 50% | 561 | 518 | 567 |
| 90% | 628 | 613 | 611 |
| UV, 272 nm + 10*310 nm | 2.034 | 3.655 | 0.0026 |

[3]Supercritical Fluid Chromatography (SFC) Polynuclear Aromatics (PNA)

Figure 3:
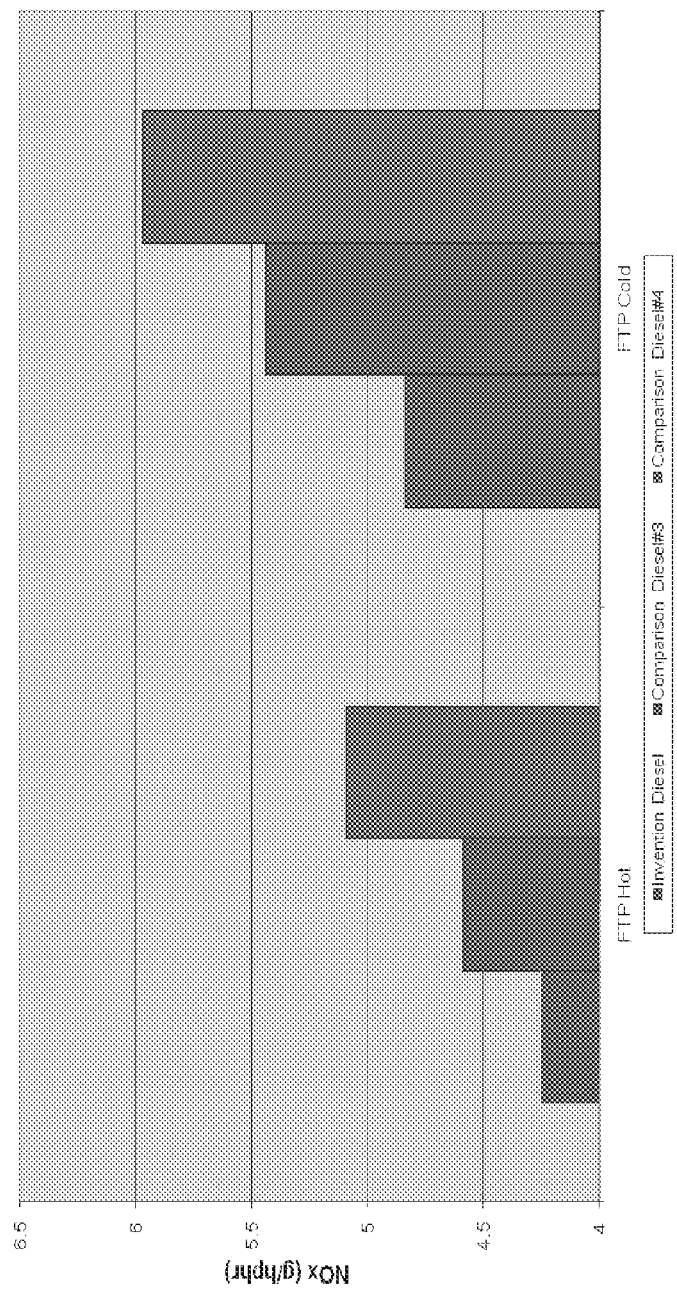
FIG. 3 depicts the nitrogen oxide emissions from a heavy duty diesel engine when the two comparative diesel fuels and the diesel fuel of the invention are employed.
Figure 4:
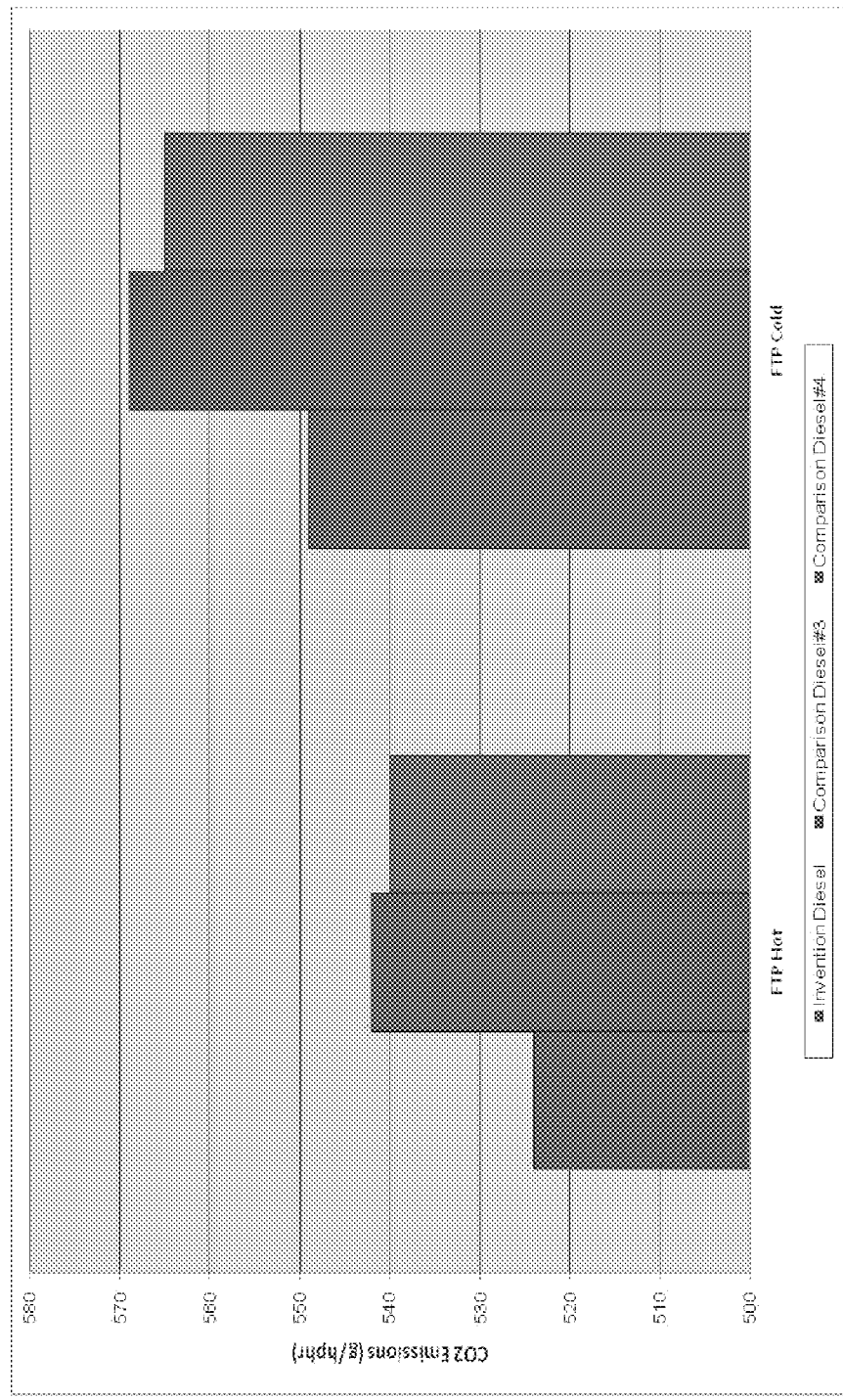
FIG. 4 depicts the carbon dioxide emissions from a heavy duty diesel engine when the two comparative diesel fuels and the diesel fuel of the invention are employed.

FIGS. 3 and 4 show that the diesel fuel composition of the present invention has lower NOx and $CO_2$ emissions when employed in a heavy duty diesel engine. Two comparative fuels and the diesel fuel composition of the present invention were injected into a heavy duty diesel engine and operated at federal test procedure hot and cold conditions.

What is claimed is:

1. A method of reducing an odor of a petroleum-derived diesel fuel composition and reducing nitrogen oxide emissions from combusting the petroleum-derived diesel fuel composition, the method comprising
  (i) providing a petroleum-derived diesel fuel composition having no odor, wherein the petroleum-derived diesel fuel composition has:
    (a) a sulfur content of less than 10 ppm;
    (b) a flash point of greater than 50° C.;
    (c) a UV absorbance, $A_{total}$, of less than 1.5 as determined by the formula comprising $$A_{total} = A_x + 10(A_y)$$

wherein $A_x$ is the UV absorbance at 272 nanometers; and
  wherein $A_y$ is the UV absorbance at 310 nanometers;
    (d) a naphthene content of greater than 5 percent;
    (e) a cloud point of less than −12° C.;
    (f) a nitrogen content of less than 10 ppm;
    (g) a 5% distillation point of greater than 300° F. and a 95% distillation point of greater than 600° F.;
    (h) an aromatic content less than or equal to 7.5 wt. %; and
    (i) a viscosity at 40° C. is less than 4.1 centistokes (cSt);
  (ii) injecting the petroleum-derived diesel fuel composition into a non-spark ignited engine having no nitrogen oxide trap,
  (iii) combusting the injected petroleum-derived diesel fuel composition of step (ii) in a combustion chamber of the non-spark ignited engine and
  (iv) recycling from about 20 volume percent to about 55 volume percent exhaust gas to the combustion chamber, wherein the nitrogen oxide emissions are
    (a) less than about 0.25 g/kWh at an engine speed of 1500 revolutions per minute and an engine load of 3 Bar BMEP; or
    (b) less than about 0.4 g/kWh at an engine speed of 2250 revolutions per minute and an engine load of 8 Bar BMEP.

2. The method of claim 1 wherein the non-spark ignited engine is an advanced combustion engine.

3. The method of claim 1 wherein the non-spark ignited engine is a heavy duty diesel engine and the method comprises (ii) injecting the petroleum-derived diesel fuel composition into the heavy duty diesel engine; and (iii) combusting the injected petroleum-derived diesel fuel composition in the combustion chamber of the heavy duty diesel engine, wherein the nitrogen oxide emissions are less than 4.5 g/hp-hr when the heavy duty diesel engine is operated at Federal Test Procedure (FTP) hot.

4. The method of claim 1 wherein the non-spark ignited engine is a heavy duty diesel engine and the method comprises (ii) injecting the petroleum-derived diesel fuel composition into the heavy duty diesel engine; and (iii) combusting the injected petroleum-derived diesel fuel composition the combustion chamber of the heavy duty diesel engine, wherein the nitrogen oxide emissions are less than 5 g/hp-hr when the heavy duty diesel engine is operated at FTP cold.

5. The method of claim 1 wherein the non-spark ignited engine is a heavy duty diesel engine and the method comprises (ii) injecting the petroleum-derived diesel fuel composition into the heavy duty diesel engine; and (iii) combusting the injected petroleum-derived diesel fuel composition in the combustion chamber of the heavy duty diesel engine, wherein carbon dioxide emissions are less than 530 g/hp-hr when the heavy duty diesel engine is operated at FTP hot.

6. The method of claim 1 wherein the non-spark ignited engine is a heavy duty diesel engine and the method comprises (ii) injecting the petroleum-derived diesel fuel composition into the heavy duty diesel engine; and (iii) combusting the injected petroleum-derived diesel fuel composition the combustion chamber of the heavy duty diesel engine, wherein carbon dioxide emissions are less than 550 g/hp-hr when the heavy duty diesel engine is operated at FTP cold.

7. The method of claim 1, wherein the sulfur content is less than 6 ppm.

8. The method of claim 1, wherein the 5% distillation point as determined by ASTM D2887 is greater than 320° F.

9. The method of claim 1, wherein the 5% distillation point as determined by ASTM D2887 is greater than 340° F.

10. The method of claim 1, wherein the 5% distillation point as determined by ASTM D2887 is greater than 375° F.

11. The method of claim 1, wherein the petroleum-derived diesel fuel composition further comprises a lubricity additive package.

12. The method of claim 11, wherein the lubricity additive package comprises monocarboxylic fatty acids, amides, esters, or mixtures thereof.

13. The method of claim 1 wherein the petroleum-derived diesel fuel composition has boiling point range from about 300° F. to about 730° F.

14. The method of claim 1 wherein the petroleum-derived diesel fuel composition has a net heat of combustion greater than 18,000 Btu/lb.

15. The method of claim 1 wherein the non-spark ignited engine is a homogenous charge compression ignition engine.

16. The method of claim 1, wherein the aromatic content of the petroleum-derived diesel fuel composition is less than 5 wt. %.

17. The method of claim 1, wherein the aromatic content of the petroleum-derived diesel fuel composition is less than 2 wt. %.

18. The method of claim 1, wherein the aromatic content of the petroleum-derived diesel fuel composition is less than 1 wt. %.

19. The method of claim 1, wherein the aromatic content of the petroleum-derived diesel fuel composition is less than 0.5 wt. %.

* * * * *